(12) United States Patent
Wang et al.

(10) Patent No.: US 11,405,538 B2
(45) Date of Patent: Aug. 2, 2022

(54) MACRO IMAGING METHOD AND TERMINAL

(71) Applicant: Huawei Technologies Co., Ltd., Shenzhen (CN)

(72) Inventors: Haiyan Wang, Shenzhen (CN); Haishui Ye, Shanghai (CN); Wei Su, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/286,378

(22) PCT Filed: Oct. 15, 2019

(86) PCT No.: PCT/CN2019/111213
§ 371 (c)(1),
(2) Date: Apr. 16, 2021

(87) PCT Pub. No.: WO2020/078346
PCT Pub. Date: Apr. 23, 2020

(65) Prior Publication Data
US 2021/0329150 A1    Oct. 21, 2021

(30) Foreign Application Priority Data
Oct. 16, 2018   (CN) .......................... 201811206371.X

(51) Int. Cl.
*H04N 5/225*    (2006.01)
*H04N 5/232*    (2006.01)
*G02B 9/62*    (2006.01)

(52) U.S. Cl.
CPC ............. *H04N 5/2254* (2013.01); *G02B 9/62* (2013.01); *H04N 5/2257* (2013.01);
(Continued)

(58) Field of Classification Search
CPC ............... H04N 5/2254; H04N 5/2257; H04N 5/23212; H04N 5/23229; H04N 5/23245; G02B 9/60; G02B 9/62
See application file for complete search history.

(56) References Cited

U.S. PATENT DOCUMENTS 8,526,128 B2    9/2013   Kubota et al.
8,542,448 B2    9/2013   Shinohara
(Continued)

FOREIGN PATENT DOCUMENTS

CN    1678034 A    10/2005
CN    1908719 A    2/2007
(Continued)

*Primary Examiner* — Daniel M Pasiewicz
(74) *Attorney, Agent, or Firm* — Leydig, Voit & Mayer, Ltd.

(57) ABSTRACT

A camera module comprises an image sensor having a size greater than or equal to 1/3.06 inch and less than or equal to 1/2.78 inch and a lens module comprising at least five lenses disposed in sequence between an object side and an image side of the camera module. A ratio between a half-image height of the lens module and a total track length of the camera module is greater than or equal to 0.5 and less than or equal to 0.6. A field of view of the lens module is greater than or equal to 100 degrees. An aperture of the lens module is greater than or equal to F1.8 and less than or equal to F2.4. An equivalent focal length of the lens module is greater than or equal to 10 mm and less than or equal to 20 mm.

20 Claims, 21 Drawing Sheets

(52) U.S. Cl.
CPC ..... *H04N 5/23212* (2013.01); *H04N 5/23229* (2013.01); *H04N 5/23245* (2013.01)

(56) References Cited

U.S. PATENT DOCUMENTS

| | | |
|---|---|---|
| 2003/0007256 A1 | 1/2003 | Usui et al. |
| 2004/0179687 A1 | 9/2004 | Lai et al. |
| 2006/0171696 A1 | 8/2006 | Murata et al. |
| 2006/0285223 A1 | 12/2006 | Watanabe et al. |
| 2008/0007644 A1 | 1/2008 | Matsumoto |
| 2011/0134303 A1 | 6/2011 | Jung et al. |
| 2015/0316750 A1 | 11/2015 | Dai et al. |
| 2017/0038504 A1 | 2/2017 | Tsai |
| 2020/0142158 A1* | 5/2020 | Yao ................... G02B 13/04 |
| 2020/0257092 A1* | 8/2020 | Zhang ................. G02B 9/62 |

FOREIGN PATENT DOCUMENTS

| | | | | |
|---|---|---|---|---|
| CN | 101009773 A | 8/2007 | | |
| CN | 201434931 Y | 3/2010 | | |
| CN | 101701793 A | 5/2010 | | |
| CN | 102096177 A | 6/2011 | | |
| CN | 102547084 A | 7/2012 | | |
| CN | 102645726 A | 8/2012 | | |
| CN | 102778745 A | 11/2012 | | |
| CN | 102906615 A | 1/2013 | | |
| CN | 103543515 A | 1/2014 | | |
| CN | 103576296 A | 2/2014 | | |
| CN | 104639831 A | 5/2015 | | |
| CN | 204613498 U | 9/2015 | | |
| CN | 105204140 A | 12/2015 | | |
| CN | 105607236 A | 5/2016 | | |
| CN | 106019540 A | 10/2016 | | |
| CN | 106254768 A | 12/2016 | | |
| CN | 106405788 A | 2/2017 | | |
| CN | 106657770 A | 5/2017 | | |
| CN | 106980170 A | 7/2017 | | |
| CN | 206321849 U | 7/2017 | | |
| CN | 107121757 A | 9/2017 | | |
| CN | 107300756 A | 10/2017 | | |
| CN | 107390352 A | * | 11/2017 | ............. B29C 45/77 |
| CN | 107390352 A | | 11/2017 | |
| CN | 206818961 U | 12/2017 | | |
| CN | 107577032 A | 1/2018 | | |
| CN | 107613209 A | 1/2018 | | |
| CN | 107835344 A | 3/2018 | | |
| CN | 207502801 U | 6/2018 | | |
| CN | 109613685 A | 4/2019 | | |
| CN | 109788089 A | 5/2019 | | |
| EP | 1613061 A1 | 1/2006 | | |
| JP | 2001021804 A | 1/2001 | | |
| JP | 2006042028 A | 2/2006 | | |
| JP | 2006243092 A | 9/2006 | | |
| JP | 2008015274 A | 1/2008 | | |
| JP | 2015022145 A | 2/2015 | | |
| JP | 6034917 B2 | 11/2016 | | |
| JP | 2017102354 A | 6/2017 | | |
| JP | 2017102354 A | * | 6/2017 | ............. G02B 13/00 |
| JP | 6222564 B2 | 11/2017 | | |
| JP | 2018514797 A | * | 6/2018 | ............. G02B 13/06 |
| KR | 20160126445 A | 11/2016 | | |
| KR | 20160126445 A | * | 11/2016 | ........... H04N 5/3572 |
| KR | 20180005464 A | 1/2018 | | |
| KR | 20180005464 A | * | 1/2018 | ............... G02B 9/64 |
| KR | 20180042182 A | 4/2018 | | |
| KR | 20180068585 A | 6/2018 | | |
| KR | 20180068585 A | * | 6/2018 | ............. G03B 7/085 |
| RU | 2607842 C1 | 1/2017 | | |
| WO | 2016176911 A1 | 11/2016 | | |
| WO | 2017057662 A1 | 4/2017 | | |

\* cited by examiner

TO

TO

TO

MACRO IMAGING METHOD AND TERMINAL

This application is a national stage of International Application No. PCT/CN2019/111213, filed on Oct. 15, 2019, which claims priority to Chinese Patent Application No. 201811206371.X, filed on Oct. 16, 2018. Both of the aforementioned applications are hereby incorporated by reference in their entireties.

TECHNICAL FIELD

This application relates to the field of terminal photographing technologies, and in particular, to a macro imaging method and a terminal.

BACKGROUND

Usually, a user may shoot a static photo or a dynamic video by using a camera on an intelligent terminal. Currently, camera design manners of intelligent terminals are classified into a prime lens design and a zoom lens design. In the prime lens design, a focal length of a camera is a determined value. For example, the focal length of the camera may be 27 mm, 30 mm, 54 mm, or another value. In the zoom lens design, a focal length of a camera can be adjusted. In a general use scenario, to ensure that a camera can focus both at an infinitely long distance from a photographed object and at an infinitely short distance from the photographed object, a focus distance of the camera is usually greater than 7 cm.

In many application scenarios, a user needs to take a picture at a short distance, for example, the user wants to take a picture of an insect that is very close to a lens assembly. However, for a shorter focus distance, for example, 1 cm to 5 cm, an imaging result of a camera of an existing intelligent terminal is blurry, and quality of an obtained image is relatively low.

SUMMARY

Embodiments of this application provide a terminal that can obtain a high-quality image through imaging in a photographing scenario in which a focus distance is, for example, 1 cm to 5 cm.

To achieve the foregoing objective, the following technical solutions are used in the embodiments of this application.

According to a first aspect, an embodiment of this application provides a terminal. The terminal includes a camera module, an input component, an output component, and a processor. From an object side to an image side, the camera module includes a lens assembly, a lens assembly driving apparatus, and an image sensor.

The lens assembly is configured to support clear imaging when a distance between a photographed object and the image sensor is within a macro range. The lens assembly driving apparatus is configured to: when the distance between the photographed object and the image sensor is within the macro range, drive the lens assembly to move along an optical axis, where a driving stroke of the lens assembly driving apparatus is related to a shortest focus distance of the terminal. The processor is configured to control the lens assembly driving apparatus, so that the lens assembly completes focusing on the photographed object. The input component is configured to receive a photographing instruction that is input by a user, where the photographing instruction is used to shoot a focused picture. The output component is configured to output the shot picture. In this way, when the distance between the photographed object and the image sensor is within the macro range, the processor can control the lens assembly driving apparatus, so that the lens assembly successfully focuses on the photographed object.

In a possible design, the macro range is from 1 cm to 5 cm.

Optionally, the lens assembly is an ultra-wide-angle lens assembly, a field of view FOV of the ultra-wide-angle lens assembly is greater than or equal to 100°, and a value range of an equivalent focal length of the ultra-wide-angle lens assembly is from 10 mm to 20 mm.

Optionally, the ultra-wide-angle lens assembly has a negative distortion in an edge field of view, and the negative distortion is greater than or equal to −30%. A horizontal magnification range of the ultra-wide-angle lens assembly in a central field of view is from 0.03 to 0.43.

Optionally, a quantity of lenses in the ultra-wide-angle lens assembly ranges from 5 to 8, and a size of the image sensor ranges from 1/3.06 to 1/2.78.

In a possible design, the lens assembly is an inner focusing lens assembly. The processor is further configured to adjust a focal length of the inner focusing lens assembly.

Optionally, the inner focusing lens assembly includes one or more lenses whose focal power is variable, and the focal power of the lens whose focal power is variable is associated with the focal length of the inner focusing lens assembly.

That the processor is configured to adjust a focal length of the inner focusing lens assembly may be specifically implemented as follows: The processor is configured to adjust the focal power of the one or more lenses whose focal power is variable, to adjust the focal length of the inner focusing lens assembly.

Optionally, a refractive index of the lens whose focal power is variable is related to the focal power of the lens whose focal power is variable.

That the processor is configured to adjust the focal power of the one or more lenses whose focal power is variable may be specifically implemented as follows: The processor is configured to control a current or voltage that is input to the lens whose focal power is variable, to change the refractive index of the lens whose focal power is variable, so as to adjust the focal power of the lens whose focal power is variable.

Alternatively, a shape of the lens whose focal power is variable is related to the focal power of the lens whose focal power is variable.

Correspondingly, that the processor is configured to adjust the focal power of the one or more lenses whose focal power is variable may be specifically implemented as follows: The processor is configured to control the lens whose focal power is variable to deform, so as to adjust the focal power of the lens whose focal power is variable.

Optionally, the lens whose focal power is variable is an electro-material lens or a deformable lens.

Therefore, the refractive index of the lens whose focal power is variable may be changed by applying an electric field to the lens whose focal power is variable, or the lens whose focal power is variable may be deformed by pushing and squeezing the lens by using a driving apparatus, so as to change the focal power of the lens whose focal power is variable, thereby adjusting the focal length of the inner focusing lens assembly. In this way, the terminal can support clear imaging when the photographed object is relatively close to the image sensor.

In a possible design, the terminal further includes a lens driving apparatus. The inner focusing lens assembly includes n lenses that are sequentially arranged along the optical axis. The n lenses include one or more movable lens groups, and each movable lens group includes one or more movable lenses. The movable lens is a lens whose position relative to the lens assembly along the optical axis is changeable, and the relative position of the movable lens along the optical axis is related to the focal length of the inner focusing lens assembly.

The lens driving apparatus is configured to drive the one or more movable lens groups in the inner focusing lens assembly to move along the optical axis, to adjust the focal length of the inner focusing lens assembly.

In this way, in this embodiment of this application, through driving of the lens driving apparatus, relative positions between movable lenses in the lens assembly along the optical axis change, that is, a spacing between the lenses in the lens assembly changes. Therefore, an optical characteristic, for example, the focal length, of the entire lens assembly may change. To be specific, in this embodiment of this application, the focal length of the lens assembly can be adjusted by dynamically adjusting the spacing between the lenses in the lens assembly, so that the terminal can obtain a relatively clear image through imaging in a macro mode.

According to a second aspect, an embodiment of this application provides a macro imaging method. The method is applied to a terminal. The terminal includes a camera module, an input component, an output component, and a processor. From an object side to an image side, the camera module includes a lens assembly, a lens assembly driving apparatus, and an image sensor. The lens assembly supports clear imaging when a distance between a photographed object and the image sensor is within a macro range. The method includes the following steps:

If it is detected that the distance between the photographed object and the image sensor is within the macro range, the processor controls the lens assembly driving apparatus to drive the lens assembly to move along an optical axis, so that the lens assembly completes focusing on the photographed object. The input component receives a photographing instruction that is input by a user, where the photographing instruction is used to shoot a focused picture. Then, the output component outputs the shot picture.

In a possible design, after the terminal detects that the distance between the photographed object and the image sensor is within the macro range, the terminal may further perform the following step:

The output component outputs a first interface, where the first interface is used to prompt the user whether to enable macro photographing.

According to the macro imaging method provided in this embodiment of this application, the terminal may detect whether the distance between the photographed object and the image sensor is within the macro range. When the macro condition is met, the lens assembly driving apparatus in the terminal pushes the lens assembly to move along the optical axis, to complete focusing. In this way, a relatively clear image can be photographed in a macro mode.

In a possible design, the macro range is from 1 cm to 5 cm.

In a possible design, the lens assembly is an ultra-wide-angle lens assembly, a field of view FOV of the ultra-wide-angle lens assembly is greater than or equal to 100°, and a value range of an equivalent focal length of the ultra-wide-angle lens assembly is from 10 mm to 20 mm.

Optionally, the ultra-wide-angle lens assembly has a negative distortion in an edge field of view, and the negative distortion is greater than or equal to −30%. A horizontal magnification range of the ultra-wide-angle lens assembly in a central field of view is from 0.03 to 0.43.

Optionally, a quantity of lenses in the ultra-wide-angle lens assembly ranges from 5 to 8, and a size of the image sensor ranges from 1/3.06 to 1/2.78.

In a possible design, the lens assembly is an inner focusing lens assembly. That the processor controls the lens assembly driving apparatus to drive the lens assembly to move along an optical axis, so that the lens assembly completes focusing on the photographed object may be specifically implemented as follows: The processor controls the lens assembly driving apparatus to drive the inner focusing lens assembly to move along the optical axis, and controls adjustment of a focal length of the inner focusing lens assembly, so that the inner focusing lens assembly completes focusing on the photographed object.

Optionally, the terminal controls, by using the processor, a current or voltage that is input to a lens whose focal power is variable, to adjust the focal power of the lens whose focal power is variable. Alternatively, the terminal controls, by using the processor, a lens whose focal power is variable to deform, to adjust the focal power of the lens whose focal power is variable. Certainly, the processor of the terminal may alternatively control, in another manner, the focal power of the lens whose focal power is variable to change, so as to adjust the focal length of the inner focusing lens assembly.

According to the macro imaging method provided in this embodiment of this application, when the terminal detects that the distance between the photographed object and the image sensor meets the macro condition, the terminal may change the focal power of the lens by controlling deformation or a refractive index of the lens, so as to adjust the focal length of the lens assembly, and may complete focusing by using the lens assembly driving apparatus. In this way, a high-quality image can be obtained through imaging in the macro mode.

DESCRIPTION OF REFERENCE SIGNS

1: Camera lens
2: Voice coil motor

DESCRIPTION OF EMBODIMENTS

First, terms used in embodiments of this application are described.

Figure 6:
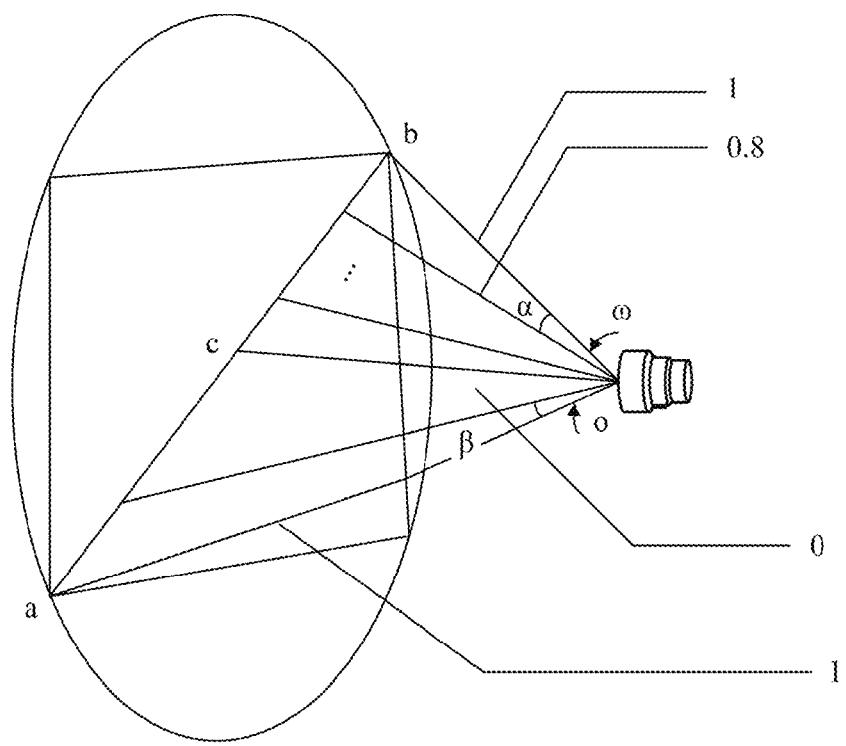
FIG. 6 is a schematic diagram of a field of view.

Field of view (Field of view, FOV): Referring to FIG. 6, in an optical instrument, with a lens assembly of the optical instrument as a vertex, an included angle formed between two edges of a maximum range in which an image of a photographed object can pass through the lens assembly is referred to as a field of view. A size of the field of view determines a view range of the optical instrument. A larger field of view indicates a larger view range. That is, an object within the field of view can be photographed by using the lens assembly, and an object outside the field of view is invisible. In FIG. 6, ab is a diameter of a visible range, a point c is a center of the visible range, oc is an object distance, and ω is the field of view.

Size of an image sensor: This term refers to a size of a photosensitive element in the image sensor.

Equivalent focal length: Because photosensitive elements of image sensors in different camera modules have different sizes, a same lens assembly achieves different imaging effects when being used with different photosensitive elements. For ease of understanding and description, focal lengths of different lens assemblies are converted to equivalent focal lengths of a standard camera based on specific proportion coefficients. The standard camera may be a full-frame camera. For a method for converting focal lengths of different lens assemblies to equivalent focal lengths of a standard camera, refer to the prior art. Details are not described herein.

Depth of field: This term refers to a clear or sharp range of imaging of a photographed object on a photosensitive element when a camera module completes focusing. A larger clear range of imaging indicates a larger depth of field, and a smaller clear range of imaging indicates a smaller depth of field. In addition, the depth of field is related to a bokeh effect. Usually, a smaller depth of field corresponds to a better bokeh effect, and a larger depth of field corresponds to a poorer bokeh effect.

In the specification and accompanying drawings of this application, the terms "first", "second", and so on are intended to distinguish between different objects, or distinguish between different processing on a same object, but do not indicate a particular order of the objects. In addition, the terms "including", "containing", or any other variant thereof mentioned in descriptions of this application, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

A terminal provided in the embodiments of this application may be a portable electronic device with a photographing function, such as a mobile phone, a wearable device, an augmented reality (Augmented Reality, AR) device/a virtual reality (Virtual Reality, VR) device, a tablet computer, a notebook computer, an ultra-mobile personal computer (Ultra-Mobile personal computer, UMPC), a netbook, or a personal digital assistant (Personal Digital Assistant, PDA). This is not limited in the embodiments of this application. An example embodiment of the portable electronic device includes but is not limited to a portable electronic device using iOS®, Android®, Microsoft®, or another operating system. The portable electronic device may alternatively be another portable electronic device, such as a laptop computer (laptop) with a touch-sensitive surface (for example, a touch panel). It should be further understood that, in some other embodiments of this application, the electronic device may be, for example, a desktop computer with a touch-sensitive surface (for example, a touch panel), instead of a portable electronic device.

Figure 1:
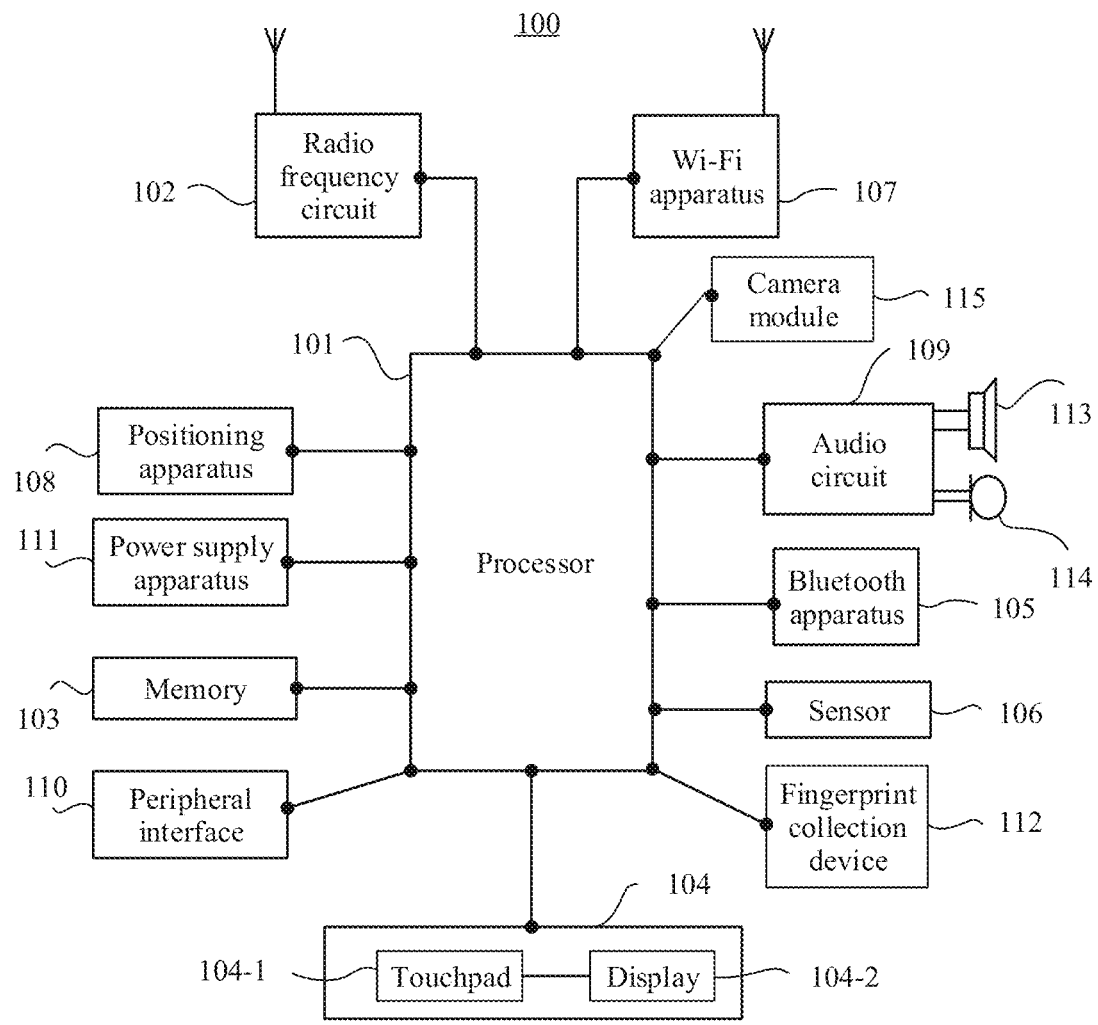
FIG. 1 is a schematic structural diagram of a terminal according to an embodiment of this application.
Figure 2:
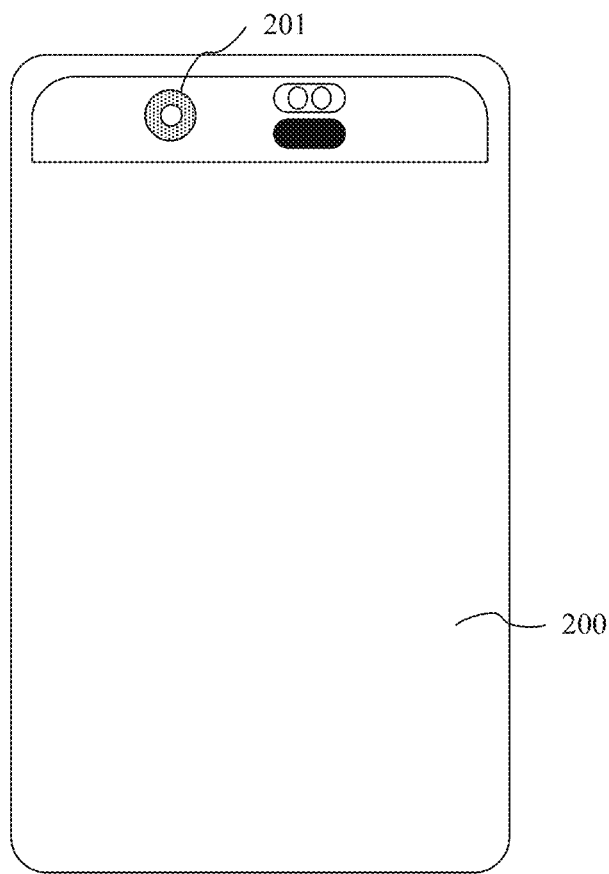
FIG. 2 is a schematic diagram of disposition of a camera module on a terminal according to an embodiment of this application.

As shown in FIG. 1 and FIG. 2, the terminal in the embodiments of this application may be a mobile phone 100. The following describes the embodiments in detail by using the mobile phone 100 as an example.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply apparatus 111. These components may communicate by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, or combine some components, or have a different component arrangement.

The following specifically describes each component of the mobile phone 100 with reference to FIG. 1.

The processor 101 is a control center of the mobile phone 100, is connected to various parts of the mobile phone 100 by using various interfaces and lines, and executes various functions and data processing of the mobile phone 100 by running or executing an application program (app for short) stored in the memory 103 and by invoking data stored in the memory 103. In some embodiments, the processor 101 may include one or more processing units. For example, the processor 101 may be configured to control adjustment of a focal length of a lens assembly in a camera module. For specific descriptions of controlling, by the processor, adjustment of the focal length of the lens assembly, refer to the following descriptions. The processor 101 is further configured to control a lens assembly driving apparatus in the camera module to drive the lens assembly to move along an optical axis, and adjust the focal length of the inner focusing lens assembly, so that the lens assembly completes focusing on a photographed object.

The radio frequency circuit 102 may be configured to receive and send radio signals during information receiving and sending or during a call. Particularly, after receiving downlink data from a base station, the radio frequency circuit 102 may send the downlink data to the processor 101 for processing. In addition, the radio frequency circuit 102 sends uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Wireless communication may be implemented by using any communications standard or protocol, including but not limited to a global system for mobile communications, a general packet radio service, code division multiple access, wideband code division multiple access, long term evolution, an email, a short message service, and the like.

The memory 103 is configured to store an application program and data. The processor 101 executes various functions and data processing of the mobile phone 100 by running the application program and the data that are stored in the memory 103. The memory 103 mainly includes a program storage area and a data storage area. The program storage area may store an operating system, and an application program required by at least one function (for example, a sound playback function and an image playback function). The data storage area may store data (such as audio data and a phone book) created during use of the mobile phone 100. In addition, the memory 103 may include a high-speed random access memory, and may further include a non-volatile memory, for example, a magnetic disk storage device, a flash memory device, or another non-volatile solid-state storage device. The memory 103 may store various operating systems, for example, an iOS operating system developed by Apple and an Android operating system developed by Google.

The mobile phone may include an input component and an output component. The input component may receive an input operation performed by a user on the mobile phone, for example, receive a voice operation that is input by the user, or receive a touch operation that is input by the user. The output component may output an internal data processing result of the mobile phone to the user. For example, the mobile phone outputs a voice, an interface, and the like by using the output component. For example, the input component and the output component may be integrated together. For example, in a possible case, an input component touchpad 104-1 and an output component display screen 104-2 are integrated into the touchscreen 104. The touchscreen 104 may include the touchpad 104-1 and the display screen 104-2. The touchpad 104-1 may be used as the input component to collect a touch event performed by the user of the mobile phone 100 on or near the touchpad 104-1 (for example, an operation performed by the user on the touchpad 104-1 or near the touchpad 104-1 by using any proper object such as a finger or a stylus), and send collected touch information to another component such as the processor 101.

A touch event performed by the user near the touchpad 104-1 may be referred to as floating touch. The floating touch may mean that the user does not need to directly touch the touchpad to select, move, or drag a target (for example, an icon), but only needs to be located near the terminal to perform a desired function. In an application scenario of the floating touch, terms such as "touch" and "contact" do not imply direct contact with the touchscreen, but are contact near or close to the touchscreen.

Specifically, two types of capacitive sensors, that is, a mutual-capacitance sensor and a self-capacitance sensor, may be disposed in the touchpad 104-1. The two types of capacitive sensors may be alternately arranged on the touchpad 104-1 in an arrayed manner. The mutual-capacitance sensor is configured to implement normal conventional multi-point touch, that is, detect a gesture of the user when the user contacts the touchpad 104-1. The self-capacitance sensor can generate a signal that is stronger than a signal generated by the mutual-capacitance sensor, so as to detect finger sensing farther away from the touchpad 104-1. Therefore, when the finger of the user hovers over the screen, because a signal generated by the self-capacitance sensor is stronger than a signal generated by the mutual-capacitance sensor, the mobile phone 100 can detect a gesture of the user above the screen, for example, at 20 mm above the touchpad 104-1.

Optionally, the touchpad 104-1 on which floating touch can be performed may be implemented in a capacitive type, an infrared light sensing type, an ultrasonic wave type, or the like. In addition, the touchpad 104-1 may be implemented in a plurality of types such as a resistive type, a capacitive type, an infrared type, and a surface acoustic wave type. The display screen 104-2 may be used as the output component, and is configured to display information entered by the user or information provided for the user, and various menus of the mobile phone 100. The display screen 104-2 may be configured in a form of a liquid crystal display, an organic light-emitting diode, or the like. The touchpad 104-1 may cover the display screen 104-2. After detecting a touch event on or near the touchpad 104-1, the touchpad 104-1 transfers the touch event to the processor 101 to determine a type of the touch event. Then, the processor 101 may provide a corresponding visual output on the display screen 104-2 based on the type of the touch event.

In FIG. 1, the touchpad 104-1 and the display screen 104-2 are used as two independent components to implement input and output functions of the mobile phone 100. However, in some embodiments, the touchpad 104-1 and the display screen 104-2 may be integrated to implement the input and output functions of the mobile phone 100.

It may be understood that the touchscreen 104 is formed by stacking a plurality of layers of materials. In this embodiment of this application, only the touchpad (layer) and the display screen (layer) are presented, and other layers are not recorded in this embodiment of this application. In addition, in some other embodiments of the present invention, the touchpad 104-1 may cover the display screen 104-2, and a size of the touchpad 104-1 is greater than a size of the display screen 104-2, so that the display screen 104-2 is completely covered by the touchpad 104-1. Alternatively, the touchpad 104-1 may be disposed on a front side of the mobile phone 100 in a full-panel form, that is, any touch of the user on the front side of the mobile phone 100 can be sensed by the mobile phone. This can implement full-touch experience on the front side of the mobile phone. In some other embodiments, the touchpad 104-1 is disposed on a front side of the mobile phone 100 in a full-panel form, and the display screen 104-2 may also be disposed on the front side of the mobile phone 100 in the full-panel form. This can implement a bezel-less structure on the front side of the mobile phone.

For example, in this embodiment of this application, the input component such as the touchpad 104-1 is configured to receive a photographing instruction that is input by the user, where the photographing instruction is used to instruct the terminal to shoot a focused picture. The output component such as the display screen 104-2 is configured to output the picture that is shot after focusing. For example, referring to FIG. 15(d), the user touches and taps the touchpad 104-1 to select a photographing option 1505, so as to input a photographing instruction. Further, the terminal shoots a picture after focusing, and the display screen 104-2 outputs the picture that is shot by the terminal after focusing.

In this embodiment of this application, the mobile phone 100 may further have a fingerprint recognition function. For example, a fingerprint collection device 112 may be disposed on a back side of the mobile phone 100, or a fingerprint collection device 112 may be disposed on the front side (for example, below the touchscreen 104) of the mobile phone 100. For another example, a fingerprint collection device 112 may be disposed in the touchscreen 104 to implement the fingerprint recognition function. In other words, the fingerprint collection device 112 may be integrated with the touchscreen 104 to implement the fingerprint recognition function of the mobile phone 100. In this case, the fingerprint collection device 112 is disposed in the touchscreen 104, and may be a part of the touchscreen 104, or may be disposed in the touchscreen 104 in another manner. In addition, the fingerprint collection device 112 may be alternatively implemented as a full-panel fingerprint collection device. Therefore, the touchscreen 104 may be considered as a panel on which fingerprint recognition can be performed in any position. The fingerprint collection device 112 may send a collected fingerprint to the processor 101, so that the processor 101 processes the fingerprint (for example, performs fingerprint verification). A main component of the fingerprint collection device 112 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The mobile phone 100 may further include the Bluetooth apparatus 105, configured to implement data exchange between the mobile phone 100 and another short-distance terminal (for example, a mobile phone or a smartwatch). The Bluetooth apparatus 105 in this embodiment of this application may be an integrated circuit, a Bluetooth chip, or the like.

The mobile phone 100 may further include at least one sensor 106, for example, a light sensor, a motion sensor, an image sensor, and another sensor. Specifically, the light sensor may include an ambient light sensor and a proximity sensor. The ambient light sensor may adjust luminance of the display screen of the touchscreen 104 based on brightness of ambient light, and the proximity sensor may power off the display screen when the mobile phone 100 moves to an ear. As a type of motion sensor, an accelerometer sensor may detect magnitudes of acceleration in various directions (generally on three axes), may detect a magnitude and direction of gravity in a static state, and may be used for an application identifying a posture of the mobile phone (such as switching between landscape orientation and portrait orientation, a related game, and magnetometer posture calibration) and a function related to vibration identification (such as a pedometer and knocking). The image sensor may be disposed in a camera module 115, and is configured to convert, into an electrical signal, a picture shot by the camera module 115. For example, a charge coupled device (Charge Coupled Device, CCD) image sensor has a high resolution (High Resolution), that is, can sense and recognize a fine object, and has a relatively large photosensitive area. A complementary metal-oxide-semiconductor (Complementary Metal-Oxide-Semiconductor, CMOS) image sensor has a characteristic of power saving, and can reduce power consumption of the mobile phone during shooting of a static photo or a dynamic video.

In addition, other sensors, such as a gyroscope, a barometer, a hygrometer, a thermometer, and an infrared sensor, that may be further disposed on the mobile phone 100 are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband Internet access for the user. In some other embodiments, the Wi-Fi apparatus 107 may also serve as a Wi-Fi wireless access point, and may provide Wi-Fi network access for another terminal.

The positioning apparatus 108 is configured to provide a geographical location for the mobile phone 100. It may be understood that the positioning apparatus 108 may be specifically a receiver of a positioning system such as a global positioning system (GPS), the BeiDou navigation satellite system, or Russia's GLONASS. After receiving the geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS serves as an auxiliary positioning server to assist the positioning apparatus 108 in ranging and positioning services. In this case, the auxiliary positioning server provides positioning assistance by communicating with the positioning apparatus 108 (that is, a GPS receiver) of the terminal such as the mobile phone 100 through a wireless communications network. In some other embodiments, the positioning apparatus 108 may alternatively be of a positioning technology based on a Wi-Fi access point. Because each Wi-Fi access point has a globally unique media access control (Media Access Control, MAC) address, the terminal may scan and collect broadcast signals of surrounding Wi-Fi access points when Wi-Fi is enabled, and therefore can obtain a MAC address that is broadcast by the Wi-Fi access point. The terminal sends, to a location server through a wireless communications network, data (for example, the MAC address) that can identify the Wi-Fi access point. The location server retrieves a geographical location of each Wi-Fi access point, calculates a geographical location of the terminal with reference to strength of the Wi-Fi broadcast signal, and sends the geographical location of the terminal to the positioning apparatus 108 of the terminal.

The audio circuit 109, a loudspeaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102 to send the audio data to, for example, another mobile phone, or outputs the audio data to the memory 103 for further processing.

The peripheral interface 110 is configured to provide various interfaces for external input/output devices (for example, a keyboard, a mouse, an external display, an external memory, and a subscriber identity module card). For example, a mouse is connected by using a universal serial bus (Universal Serial Bus, USB) interface, and a subscriber identity module (SIM) card provided by a China Telecom operator is connected by using a metal contact in a subscriber identity module card slot. The peripheral interface 110 may be configured to couple the foregoing external input/output peripheral device to the processor 101 and the memory 103.

The mobile phone 100 may further include the power supply apparatus 111 (for example, a battery and a power management chip) that supplies power to each component. The battery may be logically connected to the processor 101 by using the power management chip, to implement functions such as charging management, discharging management, and power consumption management by using the power supply apparatus 111.

The mobile phone 100 may further include the camera module 115, and the camera module 115 may be a camera of the terminal. The camera module 115 is configured to shoot a static photo, a dynamic video, or the like. In a possible implementation, from an object side to an image side, the camera module 115 includes a lens assembly, a lens assembly driving apparatus, and an image sensor. For detailed descriptions of the camera module 115, refer to the following embodiments.

Although not shown in FIG. 1, the mobile phone 100 may further include a flash, a micro projection apparatus, a near field communication (Near Field Communication, NFC) apparatus, and the like. Details are not described herein.

The following describes in detail the terminal provided in the embodiments of this application. The following provides descriptions by using an example in which the terminal is a mobile phone. This is noted herein and is not repeated in the following. Referring to FIG. 2, a mobile phone 200 is used as an example. A camera module 201 in the mobile phone 200 may be a rear-facing camera shown in FIG. 2, and the rear-facing camera is disposed on a top of a back side of the mobile phone. Certainly, the camera module may be alternatively disposed at another location, for example, disposed inside the mobile phone. When a user has a photographing requirement, the camera module is ejected to perform photographing.

Figure 3:
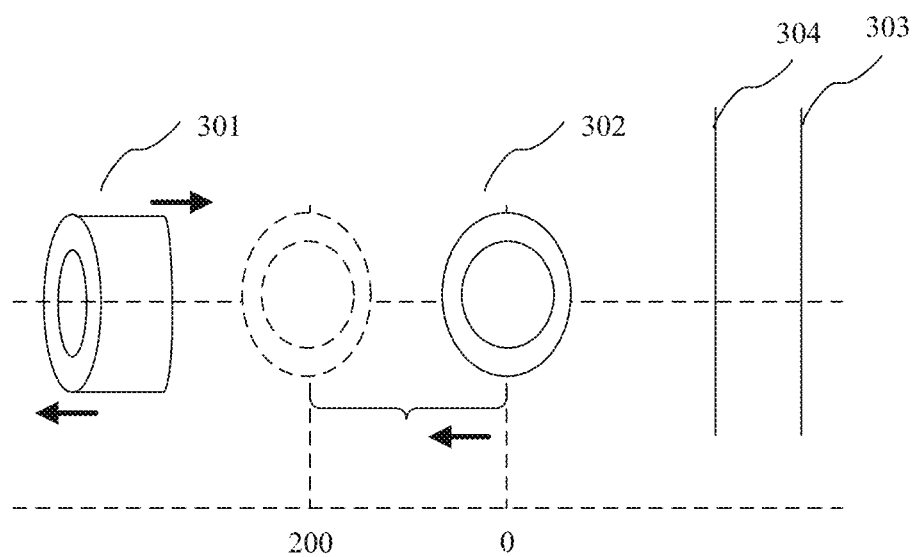
FIG. 3 is a schematic structural diagram of a camera module according to an embodiment of this application.

FIG. 3 shows an example structure of the camera module in the terminal according to this embodiment of this application. From an object side to an image side, the camera module 201 includes a lens assembly 301, a lens assembly driving apparatus 302, and an image sensor 303. It should be noted that the components in FIG. 3 are merely example components, and actual shapes and sizes of the components are not limited to the case shown in FIG. 3.

The object side is a side of a photographed object, and the image side is a side on which the image sensor implements imaging. The lens assembly driving apparatus includes but is not limited to a voice coil motor, a piezoelectric ceramic, and a micro-electro-mechanical system (Micro-Electro-Mechanical System, MEMS). The image sensor includes but is not limited to the CCD image sensor and the CMOS image sensor that are mentioned above.

The lens assembly driving apparatus is configured to drive the lens assembly to move along an optical axis. A driving stroke of the lens assembly driving apparatus is related to a shortest focus distance of the lens assembly. In this embodiment of this application, a driving stroke of a motor can make the shortest focus distance of the lens assembly range from 1 cm to 5 cm.

A focus distance is a distance between an object and an image, that is, a sum of a distance from the photographed object to the lens assembly and a distance from the lens assembly to the image sensor, that is, a distance between the photographed object and the image sensor. The shortest focus distance is a shortest focus distance for focusing the photographed object. That the photographed object is focused means that the photographed object can be imaged into a relatively clear image on the image sensor. In other words, the shortest focus distance is a shortest distance, between the photographed object and the image sensor, for forming a relatively clear image.

For example, the lens assembly driving apparatus is a motor. When the photographed object is at a relatively short distance, for example, 1 cm, from the image sensor, the motor drives the lens assembly to move along the optical axis for a specific stroke (for example, 400 μm), so that the photographed object is focused at the distance of 1 cm from the image sensor. When the photographed object is at a distance of, for example, 7 cm, from the image sensor, the motor drives the lens assembly to move along the optical axis for a specific stroke (for example, 50 μm), so that the photographed object is focused at the distance of 7 cm from the image sensor. In this embodiment of this application, the driving stroke of the motor can make the shortest focus distance of the lens assembly range from 1 cm to 5 cm. In other words, when the distance between the photographed object and the image sensor is within the range from 1 cm to 5 cm, the photographed object can be focused, that is, the photographed object can be imaged into a relatively clear image on the image sensor.

It should be noted that the lens assembly driving apparatus is mainly configured to push the lens assembly along the optical axis, and push the lens assembly along the optical axis to an optimal imaging position. For different lens assemblies disposed in the terminal, the lens assembly driving apparatus may have different driving strokes. For example, a lens assembly 1 is disposed in the terminal, and a stroke range of the lens assembly driving apparatus is from 0 μm to 400 μm. In this way, when the photographed object is 1 cm to 5 cm away from the image sensor, the lens assembly driving apparatus can push the lens assembly along the optical axis to the optimal imaging position. For another example, a lens assembly 2 is disposed in the terminal, and a driving stroke range of the lens assembly driving apparatus is from 0 μm to 300 μm. In this way, when the photographed object is 1 cm to 5 cm away from the image sensor, the lens assembly driving apparatus can push the lens assembly along the optical axis to the optimal imaging position. It can be learned that, for different lens assemblies, the lens assembly driving apparatus may also have different driving stroke ranges.

It may be understood that the lens assembly driving apparatus may be connected to the lens assembly in some manner. The voice coil motor is used as an example.

Figure 4:
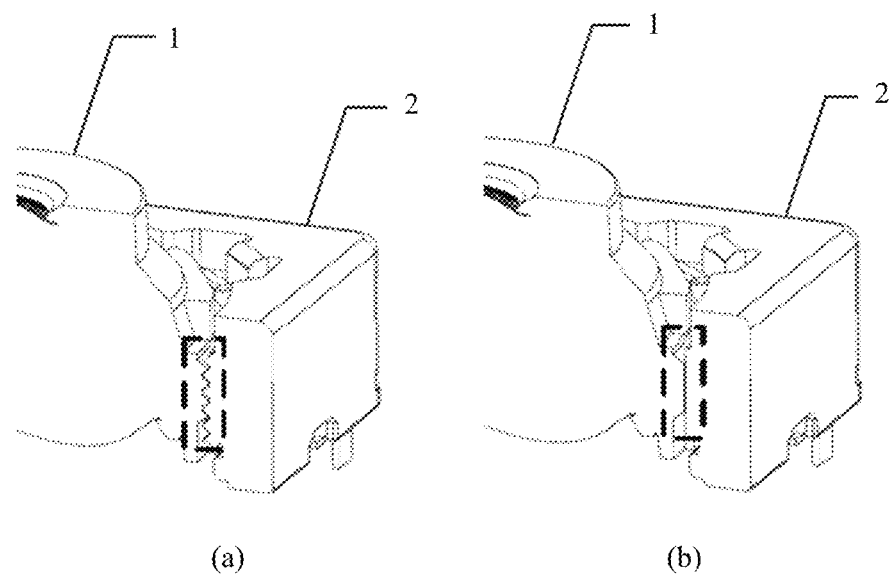
FIG. 4 is a schematic diagram of a connection between a voice coil motor and a lens assembly according to an embodiment of this application.

Optionally, the lens assembly and the voice coil motor may be connected to each other by using a screw-thread-embedded structure shown in (a) in FIG. 4. Specifically, such a structure mainly depends on fitting of screw threads between the voice coil motor 2 and the lens assembly 1, to form a preliminary bonding force, and then fixing is implemented through glue dispensing from an upper end of the screw-thread-embedded structure, so that an outer surface of the lens assembly 1 is fixed to an inner surface of the voice coil motor 2. In this way, the lens assembly 1 and the voice coil motor 2 are bonded together. Alternatively, the lens assembly 1 and the voice coil motor 2 may be connected to each other by using a screw-thread-free smooth-surfaced structure shown in (b) in FIG. 4. For a specific method for connection by using the screw-thread-free smooth-surfaced structure, refer to the prior art. Details are not described herein. Certainly, the lens assembly and the voice coil motor may be alternatively connected to each other in another manner. This is not limited in this embodiment of this application. In addition, for a connection relationship between the lens assembly and each of the MEMS and the piezoelectric ceramic, refer to a manner in the prior art. This is not limited in this embodiment of this application.

In this embodiment of this application, to support relatively clear imaging of the photographed object at the distance of 1 cm to 5 cm from the image sensor, at least one of the following three types of lens assemblies may be used:

Case 1: The lens assembly is a fixed-focus ultra-wide-angle lens assembly.

For example, a field of view (Field of view, FOV) of the ultra-wide-angle lens assembly is greater than or equal to 100°, and a value range of an equivalent focal length of the ultra-wide-angle lens assembly is from 10 mm to 20 mm.

It should be noted that, in this embodiment of this application, the terminal may implement macro imaging by disposing different lens assemblies. Specific parameters of different lens assemblies are different. Generally, when a parameter of the lens assembly falls within the parameter range mentioned in this embodiment of this application, the terminal can implement macro imaging. For example, when the FOV of the ultra-wide-angle lens assembly is 110°, and the equivalent focal length is 15 mm, macro imaging of the terminal may be implemented by adjusting another parameter, such as a curvature or a refractive index, of the ultra-wide-angle lens assembly. In this embodiment of this application, macro imaging means that the photographed object can be imaged into a relatively clear image at the distance of 1 cm to 5 cm from the image sensor. This is noted herein and is not repeated in the following.

Figure 5:
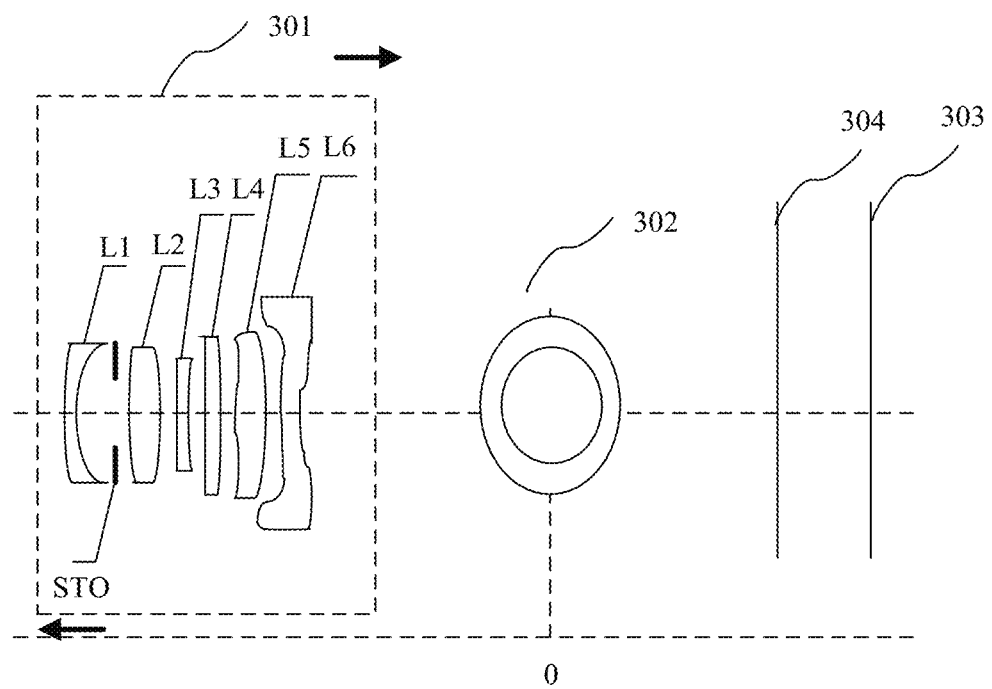
FIG. 5 is a schematic structural diagram of a camera module with an ultra-wide-angle lens assembly according to an embodiment of this application.

FIG. 5 shows a structure of an example ultra-wide-angle lens assembly according to an embodiment of this application. The ultra-wide-angle lens assembly includes six lenses. From an object side to an image side, a focal power of the first lens L1 is negative, and a focal power of the second lens L2 is positive. An aperture stop STO is disposed between L1 and L2. A focal power of the third lens L3 is negative, a focal power of the fourth lens L4 is positive, a focal power of the fifth lens L5 is positive, and a focal power of the sixth lens L6 is negative. An FOV value of the ultra-wide-angle lens assembly may be 100°, or may be a value greater than 100°. An equivalent focal length of the ultra-wide-angle lens assembly may be a value within a range from 10 mm to 20 mm. A distance from the first lens L1 to the image sensor 303 is defined as a total length (Total Track Length, TTL), a half image height of the lens is IH, and a range of IH/TTL is from 0.5 to 0.6. Certainly, the ultra-wide-angle lens assembly in this embodiment of this application may alternatively have another structure and another quantity of lenses. For example, the ultra-wide-angle lens assembly includes five lenses, and focal powers, curvatures, and the like of the lenses from the object side to the image side may be set based on an actual situation. Alternatively, the ultra-wide-angle lens assembly may use an existing structure. A specific structure of the ultra-wide-angle lens assembly is not limited in this embodiment of this application.

In this embodiment of this application, the equivalent focal length of the ultra-wide-angle lens assembly is relatively short (10 mm to 20 mm). Therefore, a smaller shortest focus distance can be obtained. In other words, when the lens assembly is relatively close to the photographed object, focusing can still be successfully performed, to obtain a high-quality and high-definition image through imaging.

Figure 7:
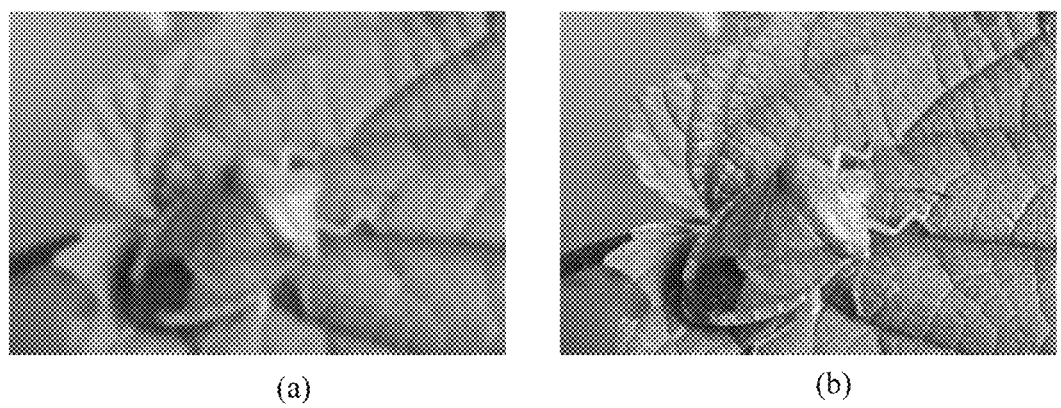
FIG. 7 shows pictures shot within a macro range by an existing mobile phone and a mobile phone according to an embodiment of this application.

Referring to FIG. 7, (a) in FIG. 7 shows an image photographed by an existing mobile phone in a macro mode (for example, a distance between a photographed object and a lens assembly is 5 cm), and the image obtained through imaging is relatively blurry; (b) in FIG. 7 is an image photographed by the mobile phone according to the embodiments of this application in a macro mode. In (b) in FIG. 7, details of an insect and a leaf are relatively clear.

In addition, when the lens assembly is relatively close to the photographed object, a depth of field of a photographed image is relatively small because a focus distance is relatively short, so that a relatively good bokeh effect is achieved for the photographed image.

Figure 8:
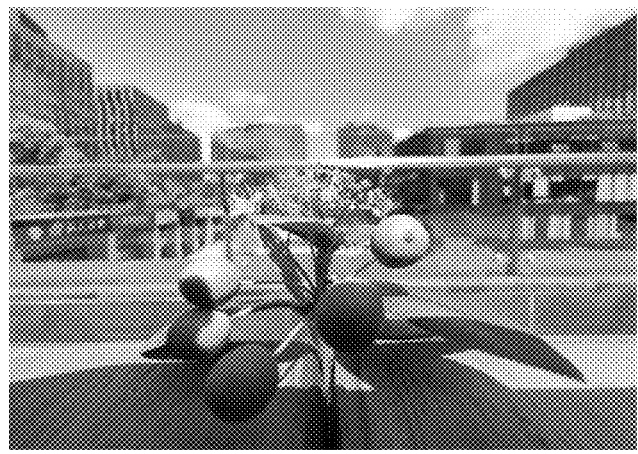
FIG. 8 shows a picture shot within a macro range by a terminal according to an embodiment of this application.

FIG. 8 shows a picture shot by the mobile phone according to the embodiments of this application. The picture has a relatively good bokeh effect.

Optionally, a horizontal magnification range of the lens assembly in a central field of view is from 0.03 to 0.43. The lens assembly has a negative distortion in an edge field of view, and the negative distortion is greater than or equal to −30%.

The horizontal magnification is a magnification in a direction perpendicular to the optical axis, and a value of the horizontal magnification is a ratio of an image size to an actual object size in the direction perpendicular to the optical axis. The edge field of view is a field of view between 0.8 and 1. Specifically, referring to FIG. 6, the entire visible range is divided into N parts, where a maximum visible range is denoted as 1, a central field of view is denoted as 0, and an area between 0.8 and 1 is an edge field of view, that is, α and β are edge fields of view. The negative distortion means that a horizontal magnification of the lens assembly in the edge field of view is less than the horizontal magnification of the lens assembly in the central field of view. In this way, when the camera module photographs a miniature landscape, a lower magnification in the edge field of view is equivalent to a decrease in a magnification caused by an increase in an object distance during photographing of a macro landscape, so that the camera module can obtain, through photographing, an image with a relatively good perspective effect.

Figure 9:
FIG. 9 shows a picture shot within a macro range by a terminal according to an embodiment of this application.

FIG. 9 shows a picture shot by the mobile phone according to the embodiments of this application. A micro scene (several small dolls on a table) and a macro scene (a building in FIG. 9) have a relatively good perspective effect, so that the picture is more stereoscopic.

Optionally, a quantity of lenses in the lens assembly ranges from 5 to 8, and a size of the image sensor ranges from 1/3.06 to 1/2.78. Optionally, the lens is made of plastic or glass, or is made of a mixture of plastic and glass. Optionally, an aperture range of the lens assembly is from F2.4 to F1.8.

Case 2: The lens assembly is an inner focusing lens assembly. The inner focusing lens assembly includes n lenses that are sequentially arranged along the optical axis. The n lenses include one or more movable lens groups. Each movable lens group includes one or more movable lenses. The movable lens is a lens whose position relative to the lens assembly along the optical axis is changeable, and the position of the movable lens along the optical axis is related to a focal length of the inner focusing lens assembly.

In the case 2, the terminal further includes a lens driving apparatus, configured to drive the one or more movable lens groups in the inner focusing lens assembly to move along the optical axis, to adjust the focal length of the inner focusing lens assembly.

Optionally, the lens driving apparatus may be a voice coil motor, an MEMS, or a piezoelectric ceramic.

Optionally, when the lens assembly driving apparatus drives the movable lens to move, relative positions between movable lenses in a same movable lens group along the optical axis remain unchanged. In other words, the lens assembly driving apparatus moves the movable lens group as a whole along the optical axis. For example, the lens assembly driving apparatus drives a first lens in the movable lens group to move 100 µm towards the object side along the optical axis, and correspondingly drives a second lens in the same movable lens group to move 100 µm towards the object side along the optical axis. Different movable lens groups may move for different distances and in directions along the optical axis. For example, in FIGS. 10, L2 and L3 are driven to move towards an object side along an optical axis, and a moving distance is a distance 1; L4 is driven to move towards an image side along the optical axis, and a moving distance is a distance 2. Different movable lens groups may move for a same distance and in a same direction along the optical axis. A specific moving rule of the movable lens group is not limited in this embodiment of this application.

Figure 10:
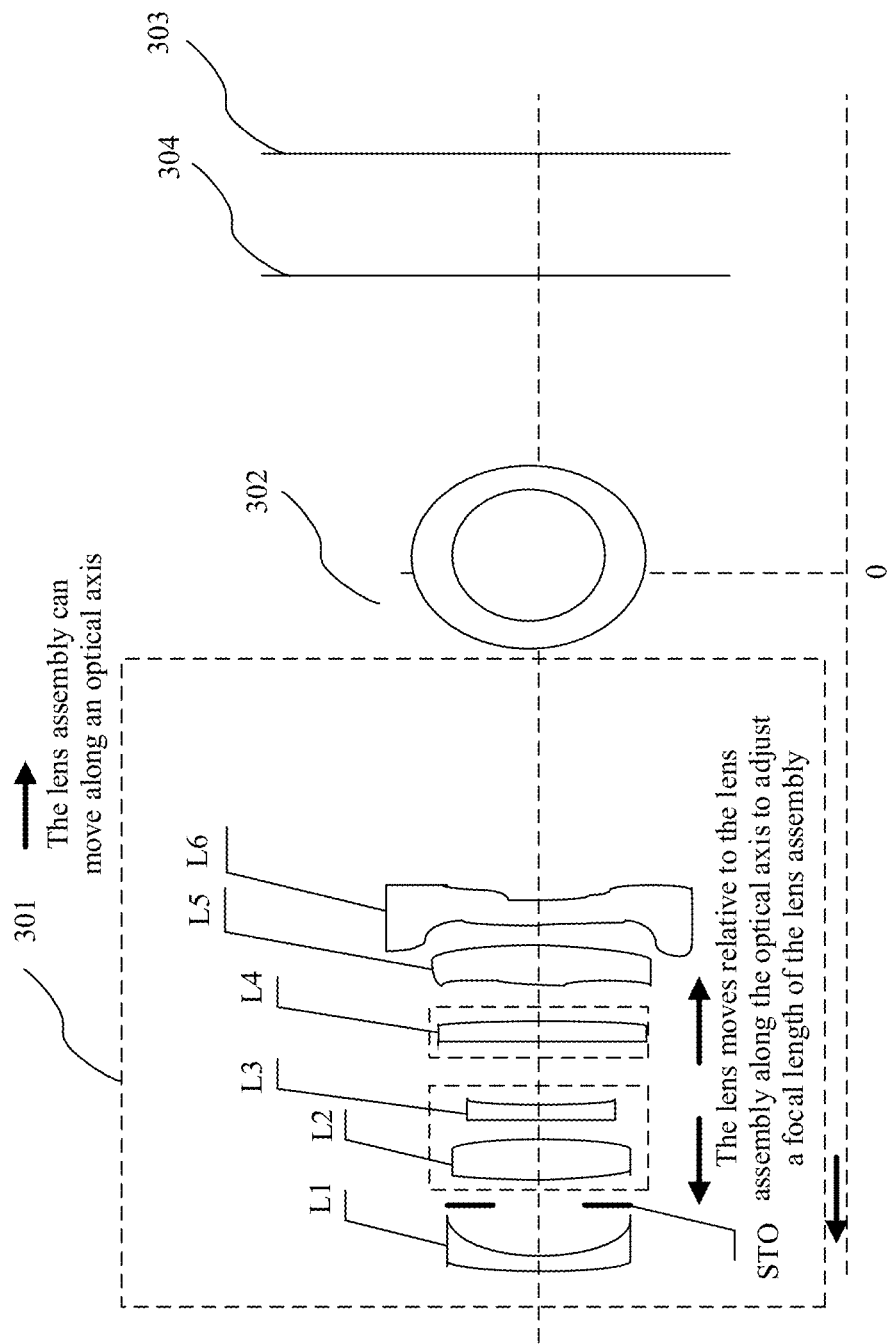
FIG. 10 is a first schematic structural diagram of a camera module with an inner focusing lens assembly according to an embodiment of this application.

The movable lens may be connected to the lens driving apparatus in a specific manner. For example, the movable lens may be connected to the lens driving apparatus in a glue dispensing manner. Certainly, for a manner of connection between the movable lens and the lens driving apparatus, reference may also be made to another manner in the prior art. This is not limited in this embodiment of this application. For example, FIG. 10 shows an example inner focusing lens assembly according to an embodiment of this application. The lens driving apparatus is a motor, and a value of n is 6. In the six lenses, the movable lens L2 and the movable lens L3 form a movable lens group, and L4 is another movable lens group. The movable lenses L2 and L3 are bonded to the motor through glue dispensing, and the movable lens L4 is also bonded to the motor through glue dispensing. Correspondingly, the motor may drive L2, L3, and L4 to move relative to the inner focusing lens assembly along a direction of the optical axis.

In this embodiment of this application, through driving of the lens driving apparatus, relative positions between movable lenses in the lens assembly along the optical axis change, that is, a spacing between the lenses in the lens assembly changes. Therefore, an optical characteristic, for example, the focal length, of the entire lens assembly may change. To be specific, in this embodiment of this application, the focal length of the lens assembly can be adjusted by dynamically adjusting the spacing between the lenses in the lens assembly, so that the terminal can obtain a relatively clear image through imaging in a macro mode.

It should be noted that a process in which the lens assembly driving apparatus pushes the movable lens is different from the foregoing described process in which the lens assembly driving apparatus pushes the lens assembly. The lens assembly driving apparatus pushes the movable lens in the lens assembly to move along the optical axis, so as to change the spacing between the lenses in the lens assembly, thereby adjusting the focal length of the lens assembly. The lens assembly driving apparatus pushes the lens assembly to move along the optical axis, so as to adjust an object distance and an image distance by moving the lens assembly along the optical axis, thereby determining an optimal position of the lens assembly for imaging the photographed object into a clear image.

FIG. 10 is merely an example of the inner focusing lens assembly in this embodiment of this application. In actual use, a quantity of lenses included in the lens assembly and which lens or lenses are specifically a movable lens or movable lenses may be set differently. This is not limited in this embodiment of this application.

Figure 11:
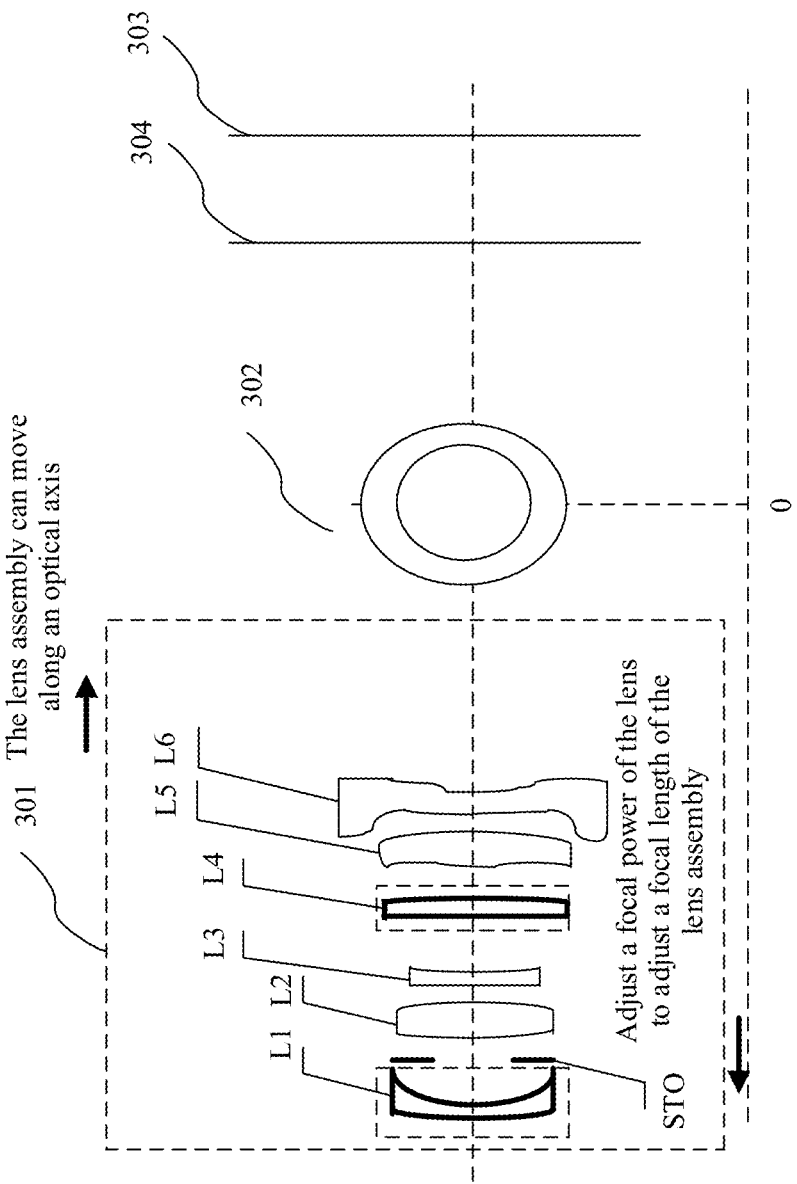
FIG. 11 is a second schematic structural diagram of a camera module with an inner focusing lens assembly according to an embodiment of this application.

Case 3: The lens assembly is an inner focusing lens assembly. Referring to FIG. 11, the inner focusing lens assembly includes one or more lenses whose focal power is variable (for example, lenses L1 and L4 in FIG. 11), and the focal power of the lens whose focal power is variable is associated with a focal length of the lens assembly.

A focal power is used to represent an ability of an optical device to bend incident parallel beams. A larger focal power indicates a higher bending degree of parallel beams. When the focal power is greater than 0, bending is convergent. When the focal power is less than 0, bending is divergent.

A shape of the lens whose focal power is variable may change under application of an electric field (for example, a changed current or voltage), and the shape of the lens whose focal power is variable is related to the focal power of the lens whose focal power is variable. Alternatively, a refractive index of the lens whose focal power is variable may change under application of an electric field, and the refractive index of the lens whose focal power is variable is related to the focal power of the lens whose focal power is variable.

Correspondingly, the processor in the terminal may adjust the focal power of the lens whose focal power is variable by controlling deformation or the refractive index of the lens whose focal power is variable, so as to adjust the focal length of the inner focusing lens assembly. Optionally, that the processor is configured to adjust the focal length of the inner focusing lens assembly may be specifically implemented as follows: The processor controls a current or voltage that is input to the lens whose focal power is variable, to change the refractive index of the lens whose focal power is variable, so as to adjust the focal power of the lens whose focal power is variable, thereby adjusting the focal length of the inner focusing lens assembly. Alternatively, that the processor is configured to adjust the focal length of the inner focusing lens assembly may be specifically implemented as follows: The processor is configured to control the lens whose focal power is variable to deform, to adjust the focal power of the lens whose focal power is variable, thereby adjusting the focal length of the inner focusing lens assembly. Herein, that the processor controls the lens whose focal power is variable to deform may be specifically as follows: The processor controls a driving apparatus, so that the driving apparatus pushes and squeezes the lens to deform.

Optionally, the lens whose focal power is variable is an electro-material lens or a deformable lens. The electro-material is a material whose refractive index may change under application of an electric field. The deformable lens may deform under driving of the driving apparatus. The driving apparatus may be a motor, an MEMS, or the like. Certainly, a material of the lens whose focal power is variable is not limited to the foregoing two types, and may alternatively be another material. This is not limited in this embodiment of this application.

In this embodiment of this application, an electric field may be applied to a lens whose focal power is variable, such as L1 or L4, to change the focal power of the lens, so as to adjust the focal length of the entire lens assembly, so that the terminal can obtain a relatively clear image through imaging in a macro mode.

It should be noted that the camera module shown in FIG. 3 may further include another component. For example, an infrared cut-off filter 304 is disposed between the lens assembly 301 and the image sensor 303, and is configured to filter out near-infrared and ultraviolet bands in ambient light. Optionally, a thickness of the infrared cut-off filter is 0.11 mm or 0.21 mm, and a material of the infrared cut-off filter is resin or blue glass. Certainly, the infrared cut-off filter may alternatively be of another material, and/or a filter with another thickness. A material and thickness of the filter are not limited in this embodiment of this application.

Figure 12:
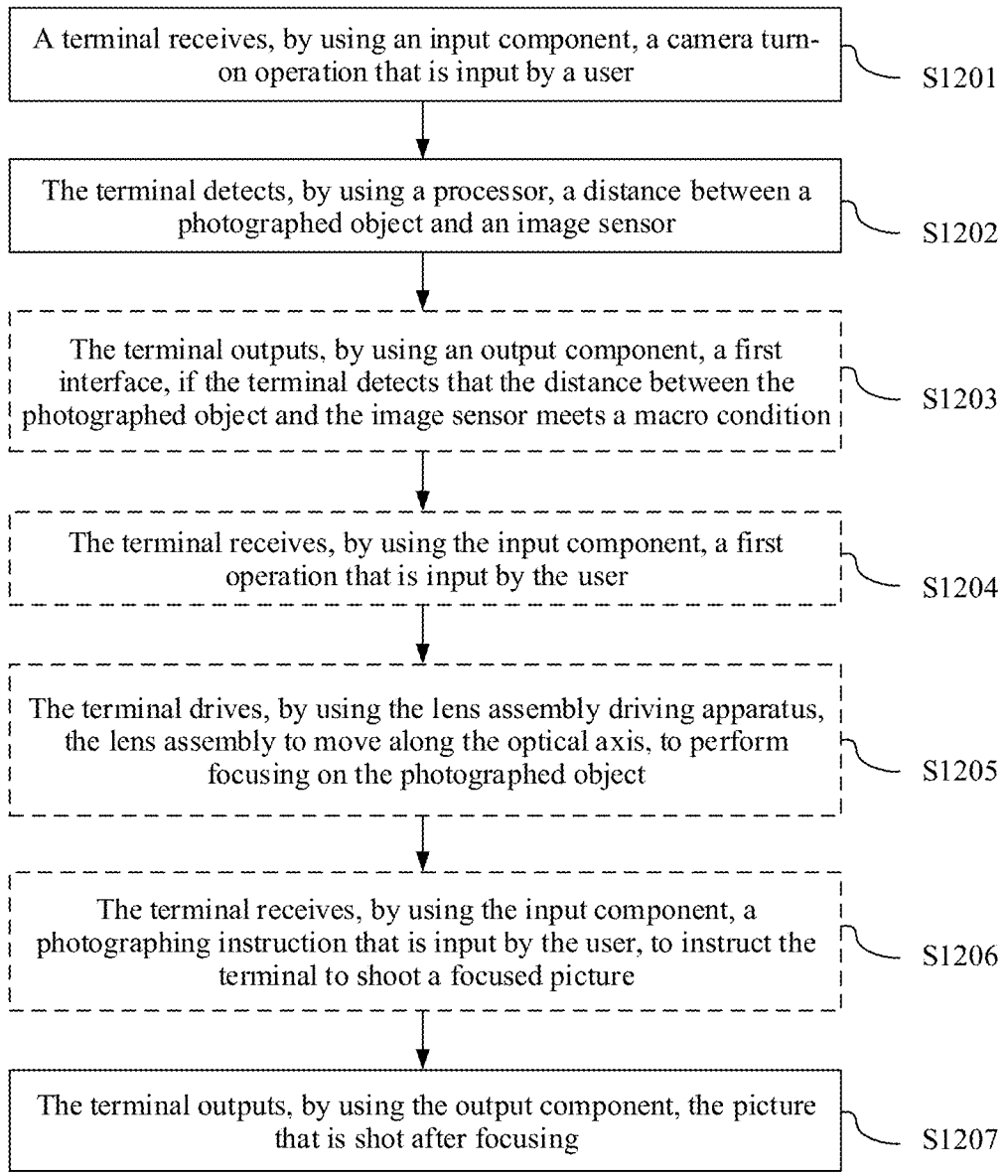
FIG. 12 is a flowchart of a macro imaging method according to an embodiment of this application.

An embodiment of this application further provides a macro imaging method. Referring to FIG. 12, the method is applied to the terminal shown in the foregoing case 1. The terminal has a camera module, an input component, and an output component. From an object side to an image side, the camera module has a lens assembly, a lens assembly driving apparatus, and an image sensor. The lens assembly is an ultra-wide-angle lens assembly, and the method includes the following steps.

S1201: The input component receives a camera turn-on operation that is input by a user, to turn on a camera.

Figure 15A:
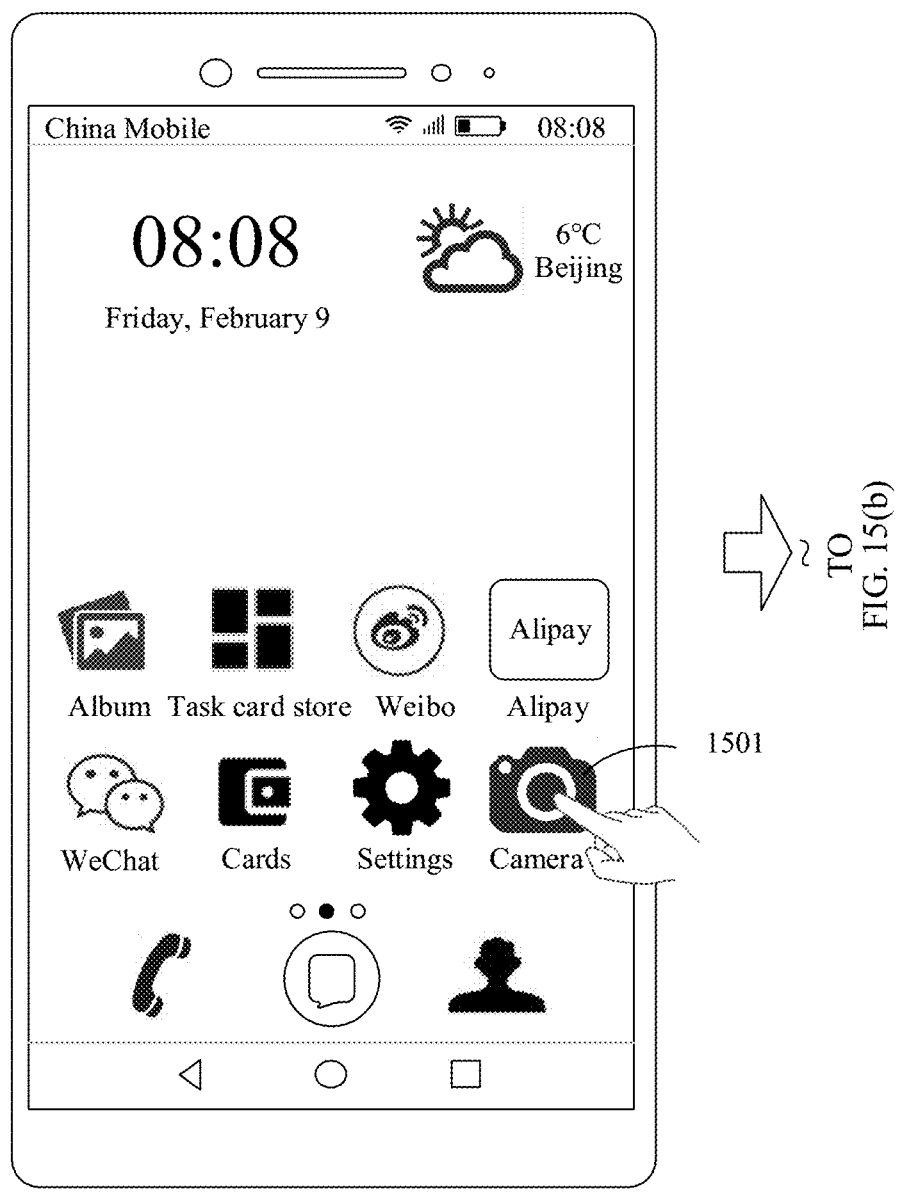
FIG. 15(a) to FIG. 15(d) are a first schematic diagram of a macro imaging scenario according to an embodiment of this application.
Figures 15B, 15C:
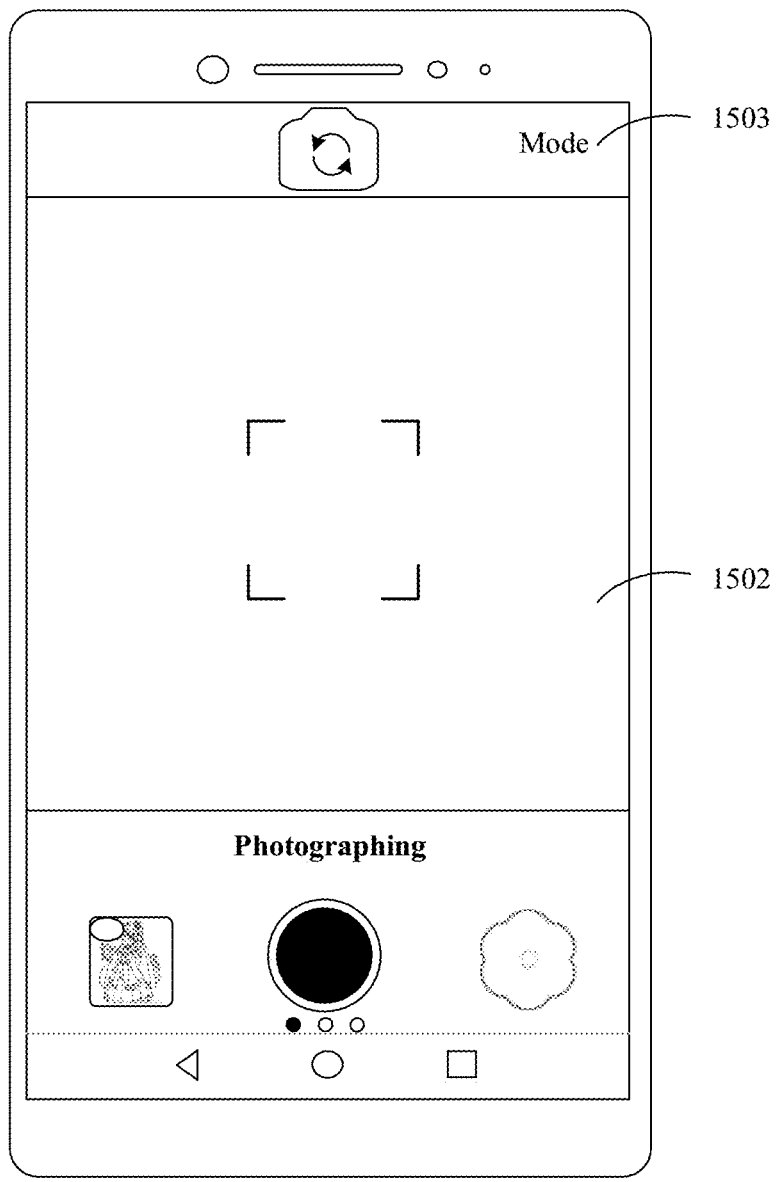
Figure 15C:
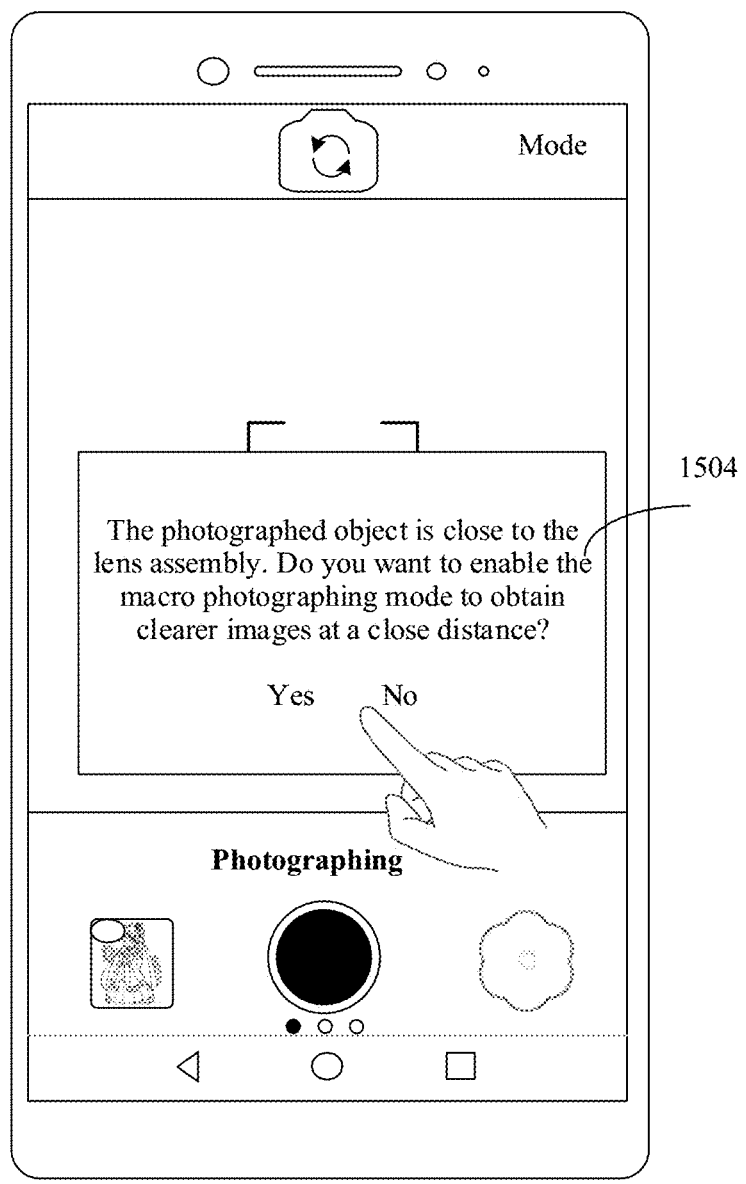

For example, the input component may be a touchpad 104-1. Referring to FIG. 15(a), the user touches and taps a camera icon 1501 displayed on a screen, and the touchpad 104-1 collects information about the camera turn-on operation that is input by the user, and transfers the information to a processor for further processing, to turn on the camera. FIG. 15(b) shows a camera interface 1502 of the terminal. The interface may be displayed to the user by a display screen 104-2 of the terminal.

S1202: The processor detects a distance between a photographed object and the image sensor.

(Optional) S1203: The terminal detects that the distance between the photographed object and the image sensor is within a macro range, and the output component outputs a first interface 1504, where the first interface 1504 is used to prompt the user whether to enable macro photographing.

The macro range is from 1 cm to 5 cm.

Optionally, the processor 101 of the terminal measures the distance between the photographed object and the image sensor in a laser ranging manner. For a specific principle and process of laser ranging, refer to the prior art. Details are not described herein. Alternatively, the processor 101 collects an image on the image sensor, and when the image is relatively blurry, may preliminarily determine that the photographed object is relatively close to the image sensor.

Optionally, the processor 101 feeds back the measured distance to the lens assembly driving apparatus.

Referring to FIG. 15(a) to FIG. 15(d), after the camera of the terminal is turned on, if the terminal detects that the distance between the photographed object and the image sensor is within the macro range, as shown in FIG. 15(c), the output component of the terminal, that is, the display screen 104-2, outputs the first interface 1504, to prompt the user whether to enable macro photographing, so as to obtain better imaging quality of short-distance photographing.

S1204: The input component receives a first operation that is input by the user, where the first operation is used to instruct the terminal to enable macro photographing.

As shown in FIG. 15(c), the display screen 104-2 displays options "yes" and "no", and the user may input the first operation by using the input component, for example, touch the option "yes" by using the touchpad 104-1 shown in FIG. 1. Optionally, the touchpad 104-1 sends collected touch information (that is, tapping the option "yes" by the user) to, for example, the processor for processing.

Optionally, when the user touches the option "no" by using, for example, the touchpad 104-1, the terminal can determine that a real photographing intention of the user is not macro photographing. In this case, the terminal may shoot a picture by using an existing method.

S1205: Under control of the processor, the lens assembly driving apparatus drives the lens assembly to move along an optical axis, to perform focusing on the photographed object.

For example, the terminal may automatically perform focusing on the photographed object. To be specific, after the terminal receives the first operation of the user and determines to enable macro photographing, the processor of the terminal may control the lens assembly driving apparatus, so that the lens assembly driving apparatus drives the ultra-wide-angle lens assembly to move along the optical axis, thereby completing a focusing process. The terminal may further receive a focusing operation that is input by the user on a mobile phone interface, and adjust a position of the ultra-wide-angle lens assembly along the optical axis based on the focusing operation. For example, referring to FIG. 15(d), the user may select a focus by touching an insect displayed on the display screen. After receiving an input of the user, the terminal uses the insect as the focus, and adjusts a position of the ultra-wide-angle lens assembly along the optical axis.

S1206: The input component receives a photographing instruction that is input by the user, to instruct the terminal to shoot a focused picture.

Figure 15D:
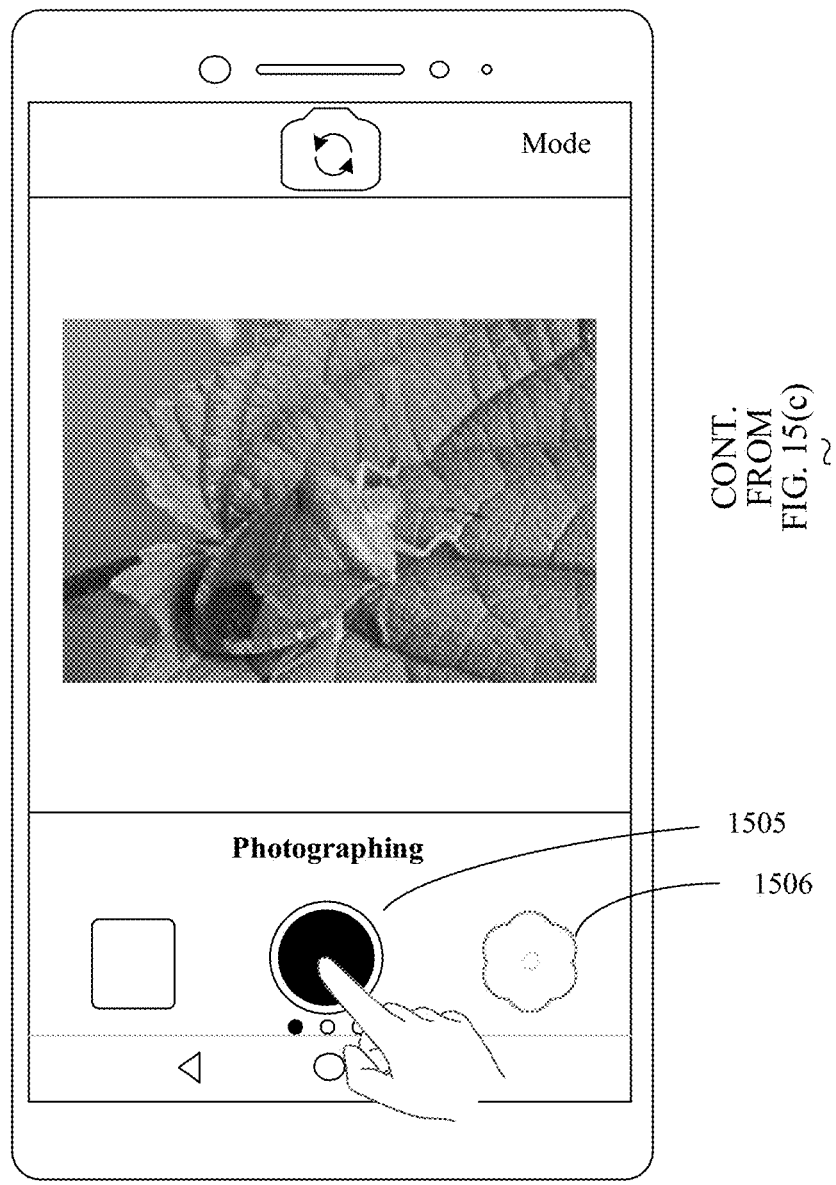
Figure 16A:
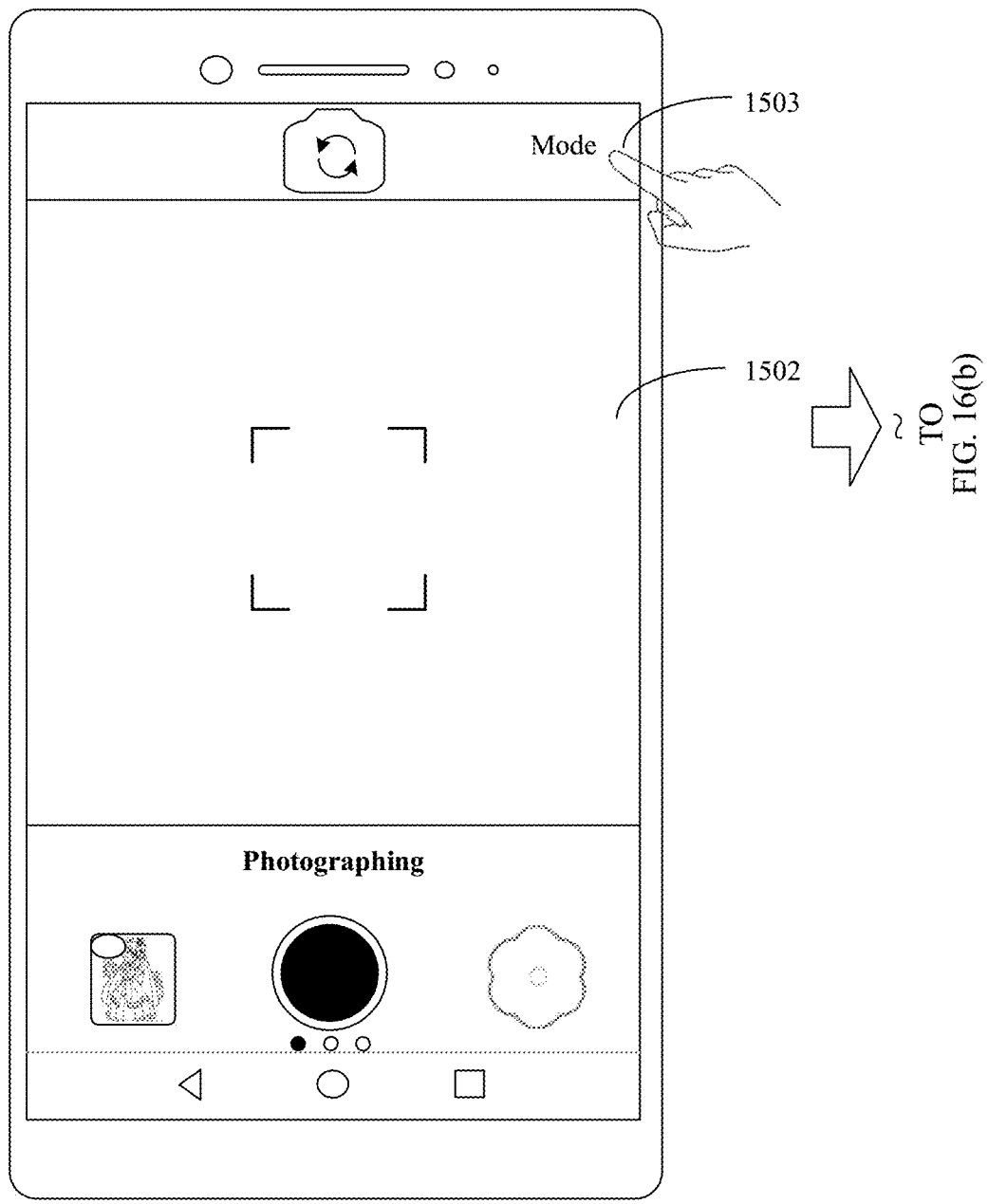
FIG. 16(a) to FIG. 16(c) are a second schematic diagram of a macro imaging scenario according to an embodiment of this application.
Figure 16B:
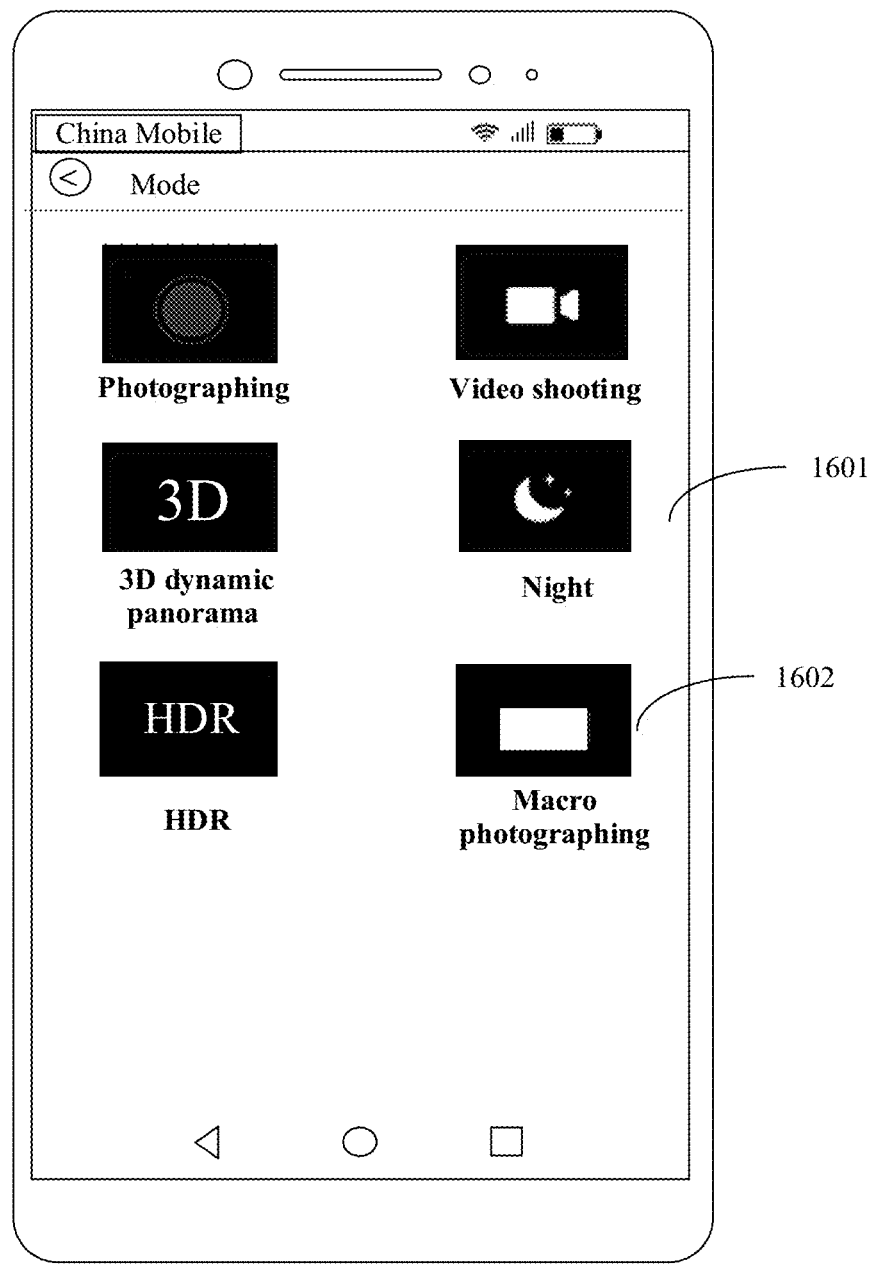
Figure 16C:
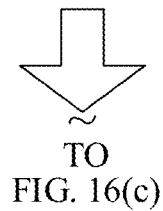
Figure 16C:
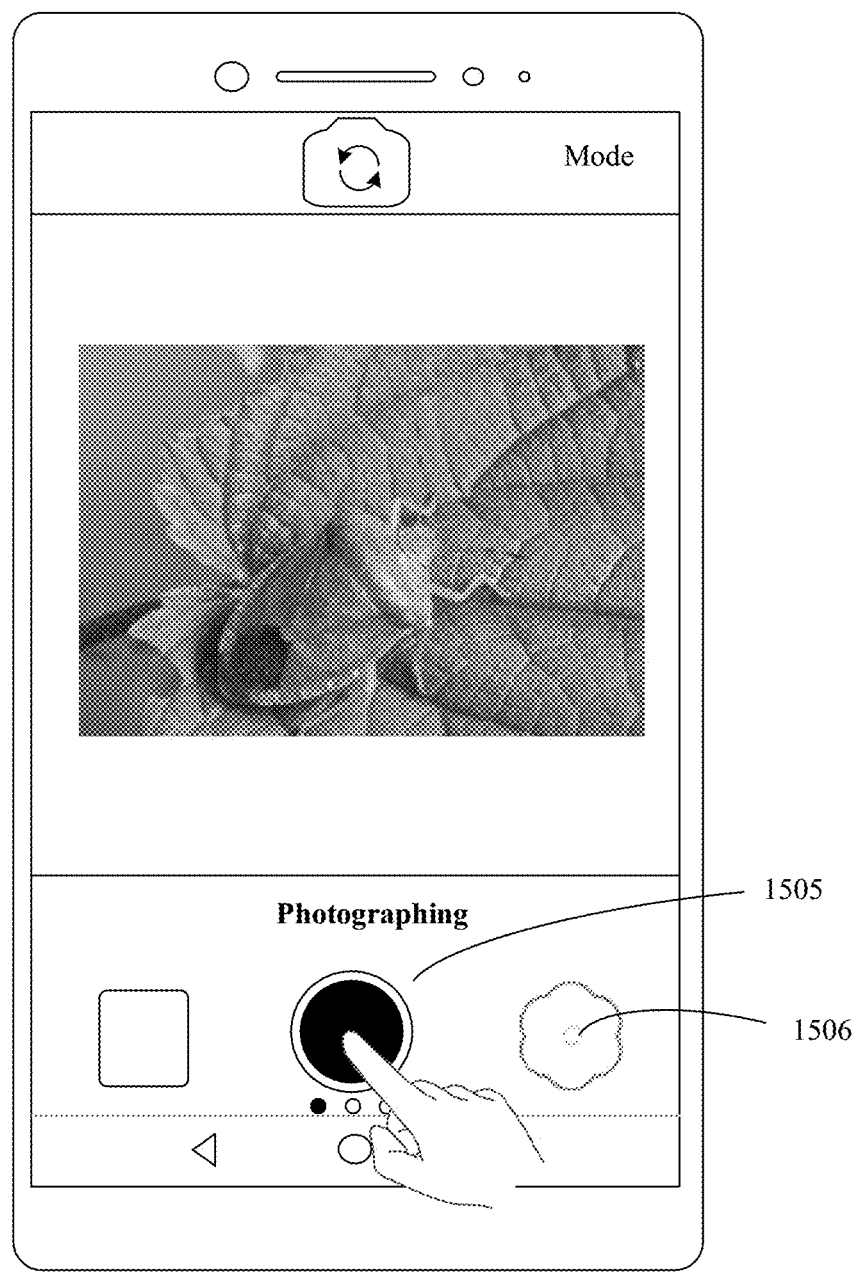

For example, referring to FIG. 15(d), assuming that the user wants to shoot a static picture in a macro mode, the user taps a photographing option 1505 by using the touchpad 104-1, to input a photographing instruction; assuming that the user wants to shoot a dynamic video in a macro mode, the user taps a shooting option 1506 by using the touchpad 104-1, to input a shooting instruction.

Figure 17A:
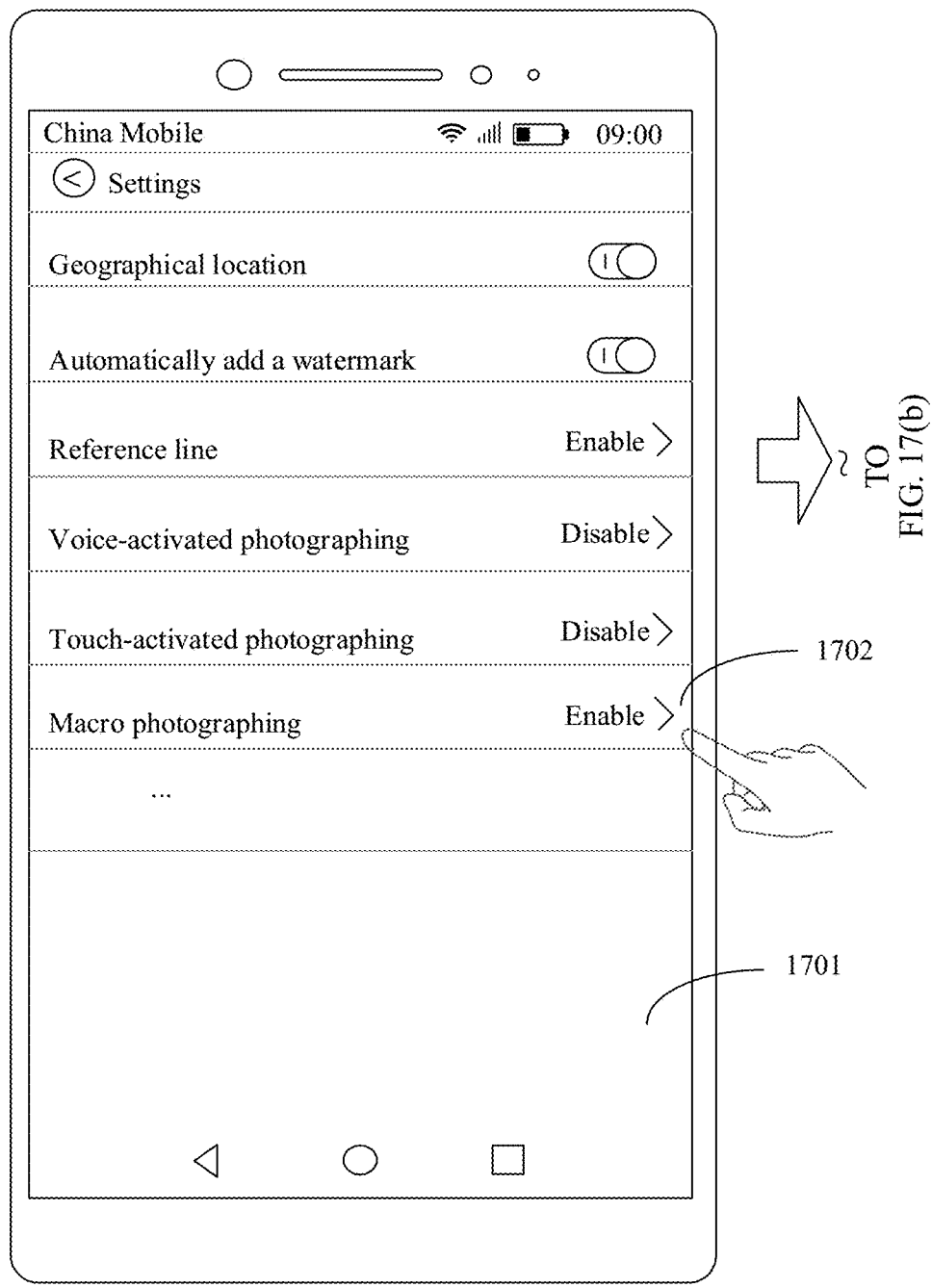
FIG. 17(a) to FIG. 17(d) are a third schematic diagram of a macro imaging scenario according to an embodiment of this application.
Figures 17B, 17C:
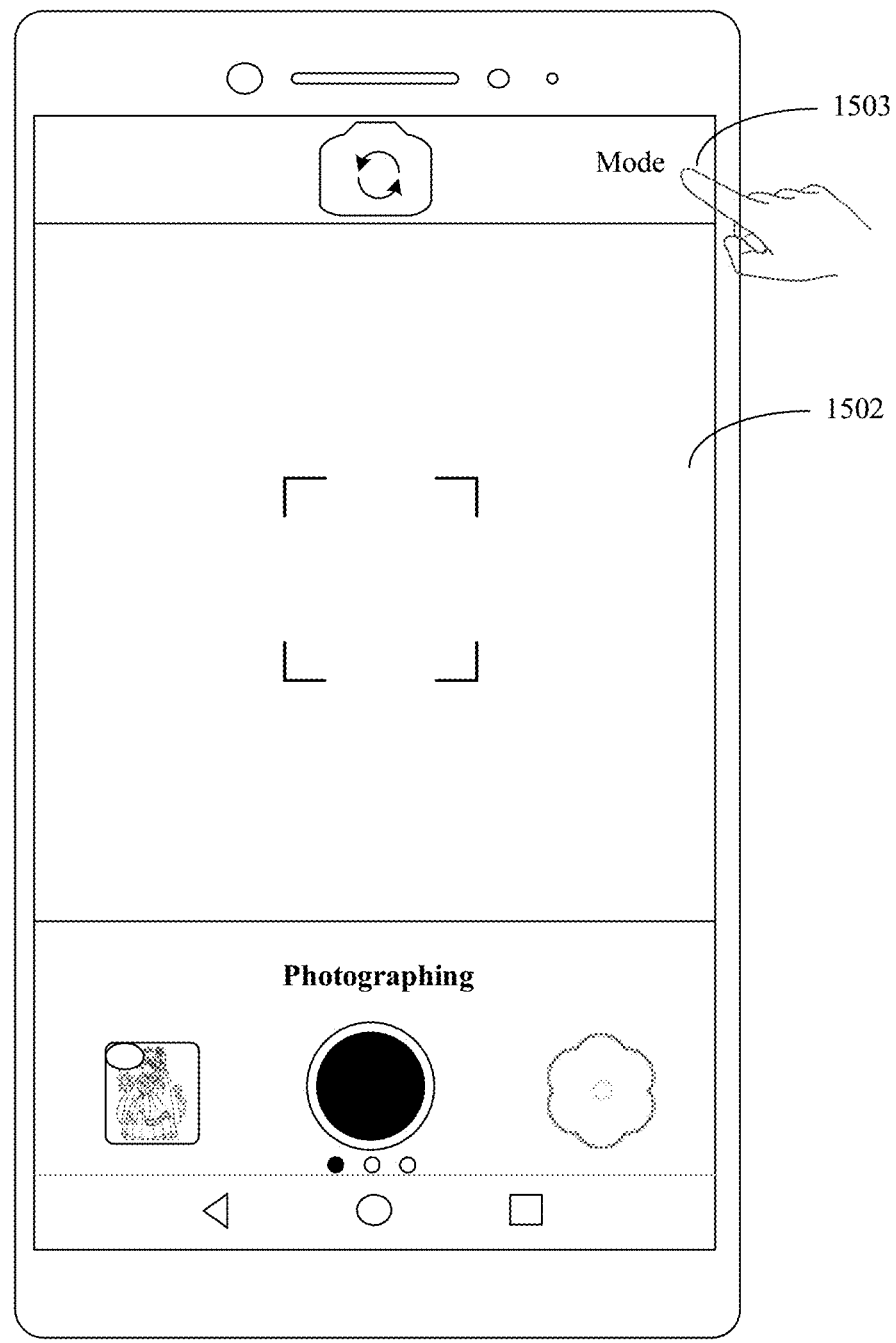
Figure 17C:
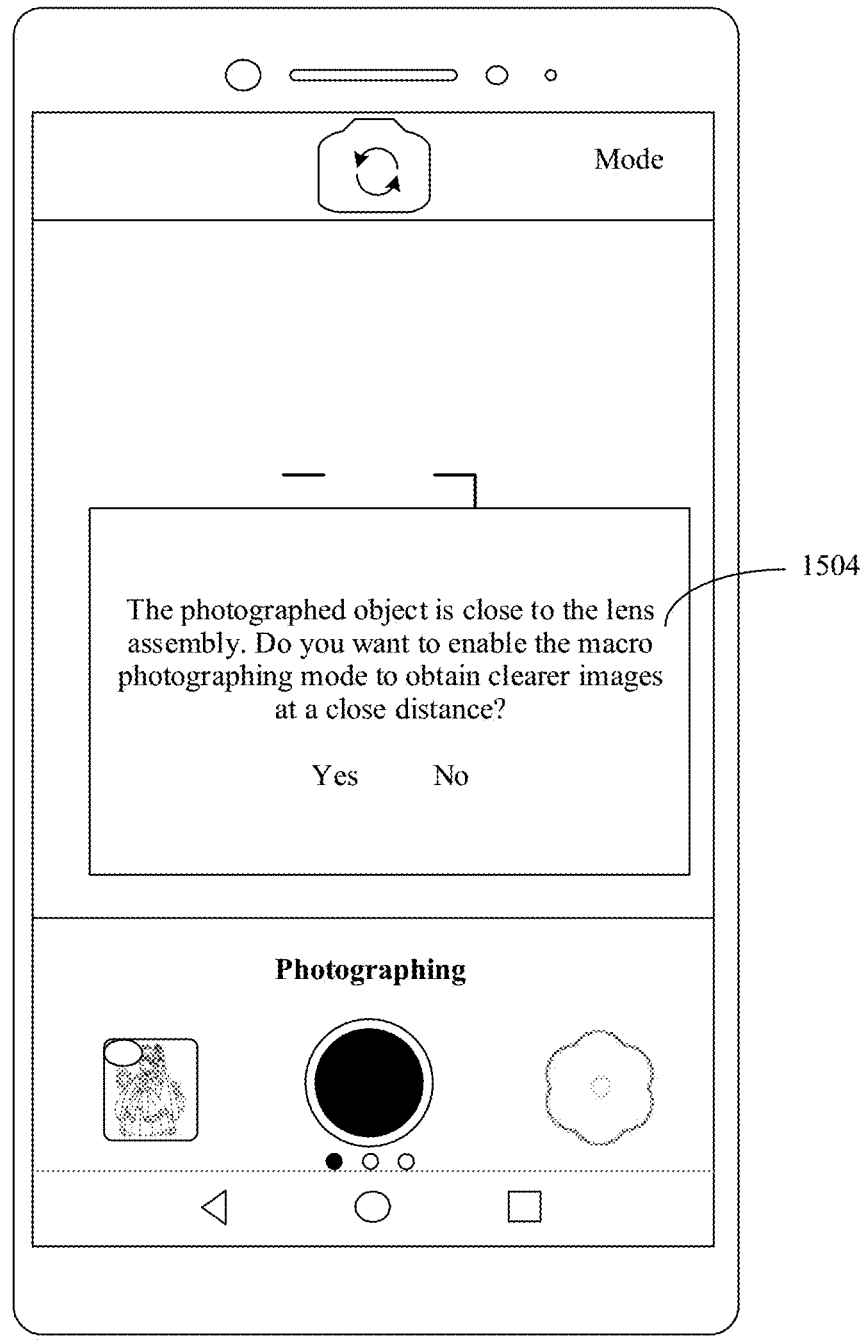
Figure 17D:
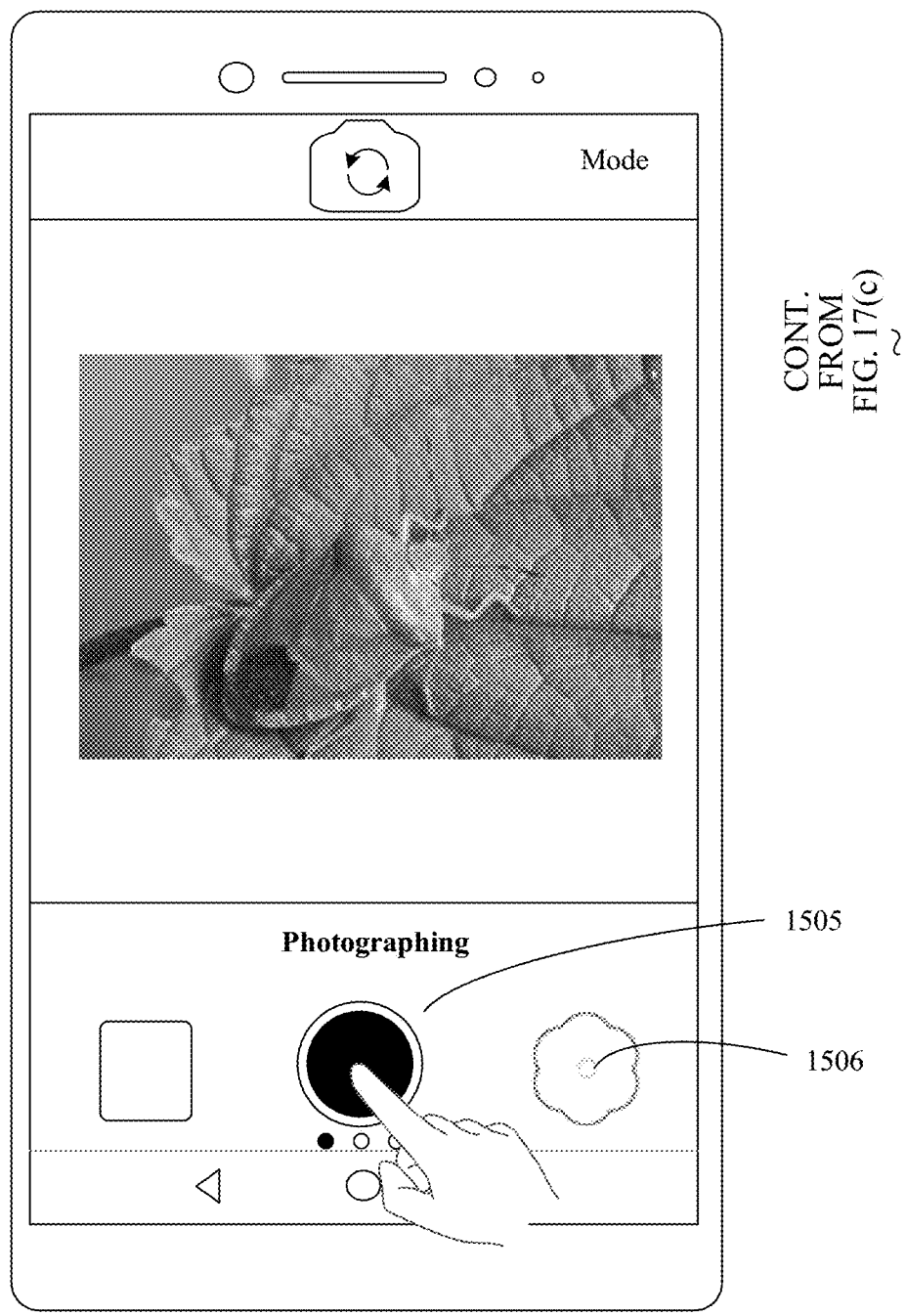

Certainly, referring to FIG. 17(a), if the terminal has enabled "voice-activated photographing", the user may input a voice by using the input component such as a microphone, to input a photographing instruction. Alternatively, the user may input a photographing instruction in another manner by using another input component. Details are not described herein in this embodiment of this application.

S1207: The output component outputs the picture that is shot after focusing.

Referring to FIG. 15(d), the user may tap the photographing option 1505 by using the touchpad 104-1, to trigger the terminal to shoot a picture in the macro mode, and the output component, for example, the display screen 104-2, outputs the picture shot in the macro mode.

Certainly, when the terminal detects that the distance between the photographed object and the image sensor is within the macro range, the terminal may not output the first interface 1504 shown in FIG. 15(c), but automatically enables the macro photographing mode, and drives the ultra-wide-angle lens assembly by using the lens assembly driving apparatus, to complete focusing. Then, the terminal shoots and outputs the focused picture. In other words, in FIGS. 12, S1203 and S1204 are optional steps.

According to the macro imaging method provided in this embodiment of this application, the terminal may detect whether the distance between the photographed object and the image sensor meets a macro condition. When the macro condition is met, the lens assembly driving apparatus in the terminal pushes the lens assembly to move along the optical axis, to complete focusing. In this way, a relatively clear image can be photographed in the macro mode.

Figure 13:
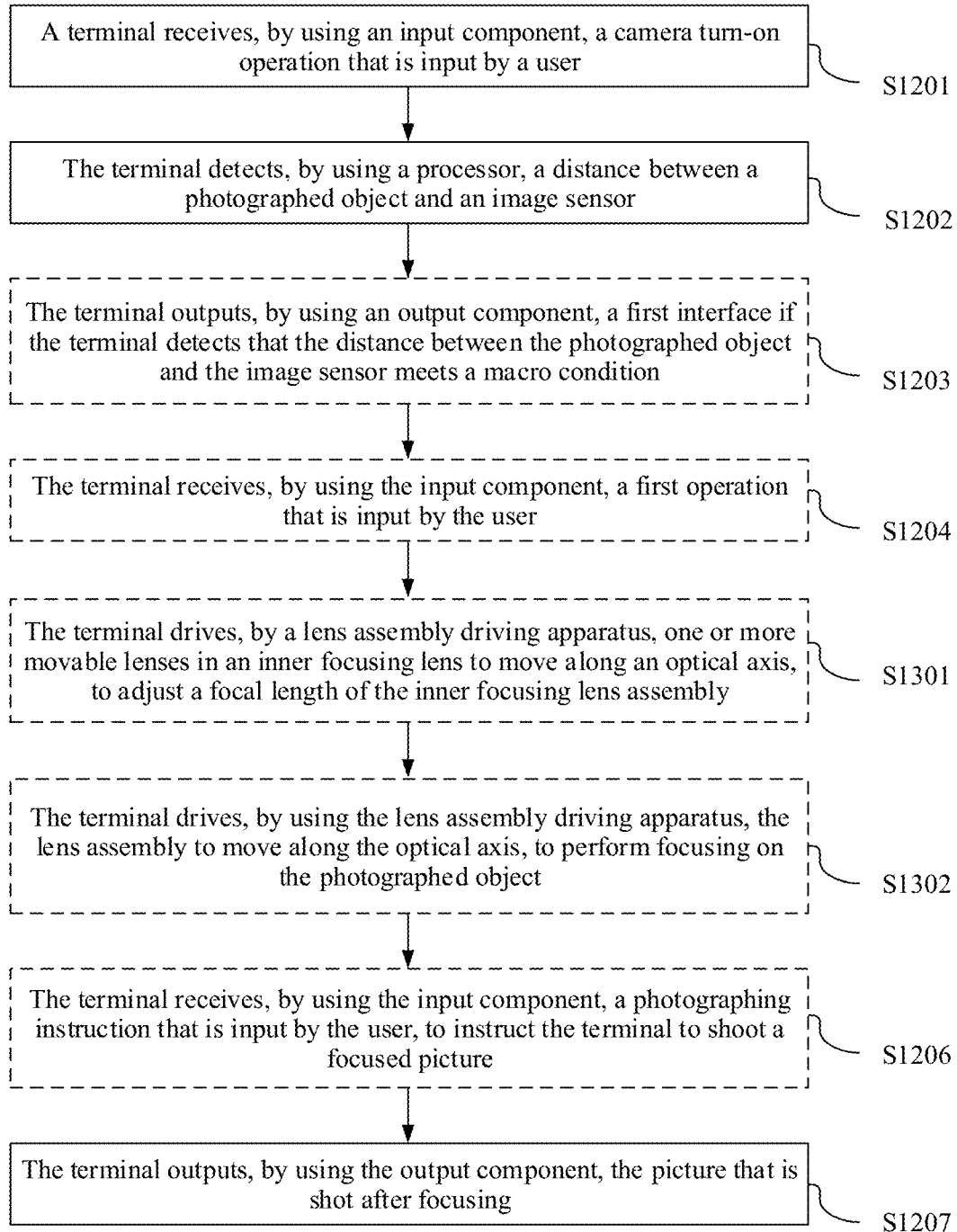
FIG. 13 is a flowchart of a macro imaging method according to an embodiment of this application.

An embodiment of this application further provides a macro imaging method. The method is applied to the terminal shown in the foregoing case 2. The terminal has a camera module, an input component, and an output component. From an object side to an image side, the camera module has an inner focusing lens assembly, a lens assembly driving apparatus, and an image sensor. The inner focusing lens assembly includes n lenses that are sequentially arranged along an optical axis. The n lenses include one or more movable lens groups. Each movable lens group includes one or more movable lenses. The movable lens is a lens whose position relative to the lens assembly along the optical axis is changeable, and the position of the movable lens along the optical axis is related to a focal length of the lens assembly. Referring to FIG. 13, the method includes steps S1201 to S1204, S1301, S1302, S1206, and S1207.

For descriptions of S1201 to S1204, refer to the foregoing descriptions. Details are not described herein again.

S1301: Under control of a processor, a lens driving apparatus drives the one or more movable lens groups in the inner focusing lens assembly to move along the optical axis, to adjust the focal length of the inner focusing lens assembly.

For example, the lens assembly driving apparatus is a motor. Referring to FIG. 10, the motor may drive a movable lens group constituted by L2 and L3 to move towards the object side along the optical axis, so as to adjust the focal length of the lens assembly.

S1302: Under control of the processor, the lens assembly driving apparatus drives the inner focusing lens assembly to move along the optical axis, to perform focusing on a photographed object.

For descriptions of S1206 and S1207, refer to the foregoing descriptions. Details are not described herein again.

According to the macro imaging method provided in this embodiment of this application, when the terminal detects that a distance between the photographed object and the image sensor meets a macro condition, the lens assembly driving apparatus in the terminal may drive the one or more movable lenses to move along the optical axis, to dynamically adjust the focal length of the lens assembly, and the lens assembly driving apparatus can push, in a macro mode, the lens assembly to move along the optical axis, to complete focusing. In this way, a clear image can also be obtained through imaging in the macro mode.

Figure 14:
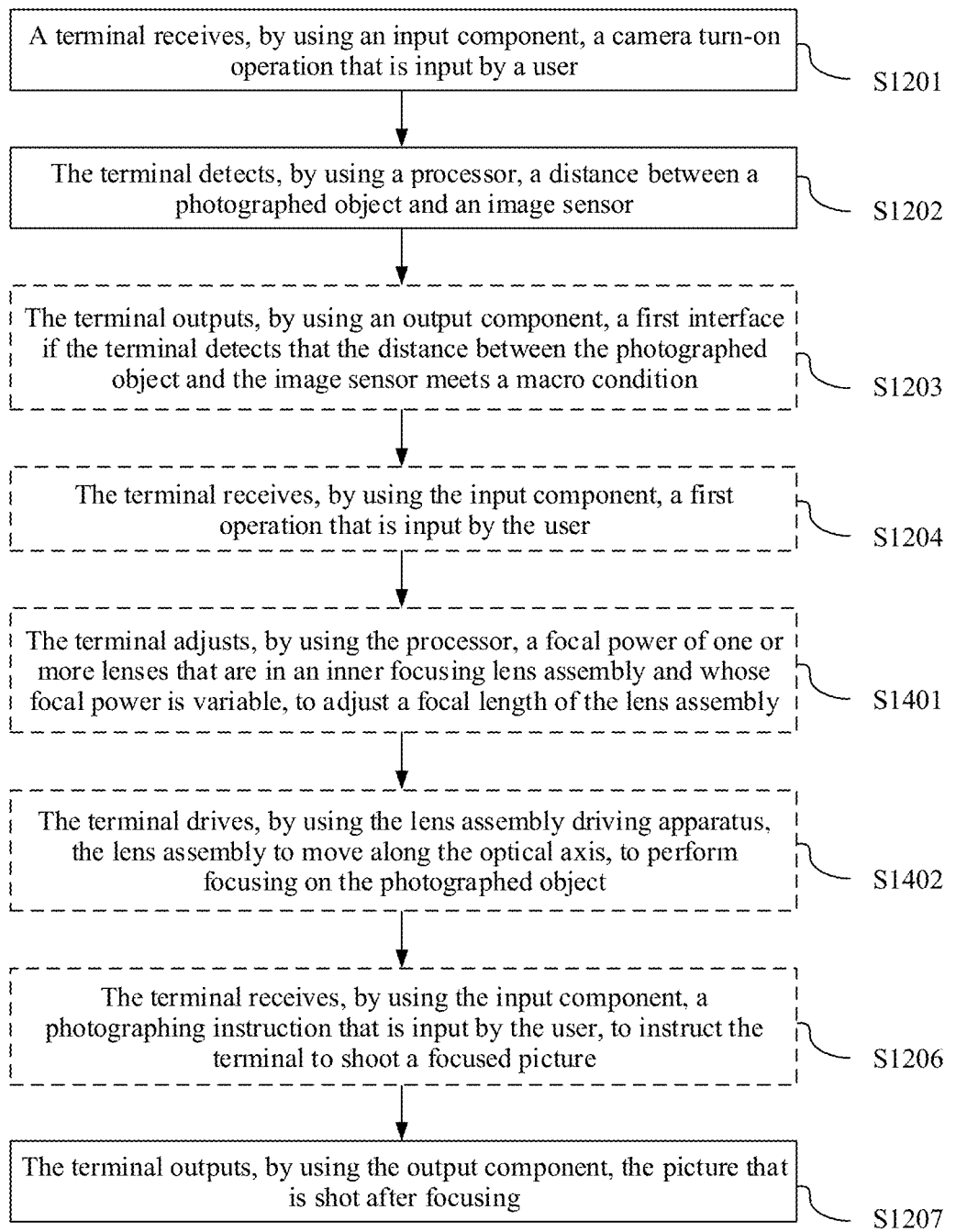
FIG. 14 is a flowchart of a macro imaging method according to an embodiment of this application.

An embodiment of this application further provides a macro imaging method. The method is applied to the terminal shown in the foregoing case 3. The terminal has a camera module, an input component, an output component, and a processor. From an object side to an image side, the camera module has a lens assembly, a lens assembly driving apparatus, and an image sensor. The lens assembly is an inner focusing lens assembly. The inner focusing lens assembly includes one or more lenses whose focal power is variable, and the focal power of the lens whose focal power is variable is associated with a focal length of the inner focusing lens assembly. Referring to FIG. 14, the method includes steps S1201 to S1204, S1401, S1402, S1206, and S1207.

For descriptions of S1201 to S1204, refer to the foregoing descriptions. Details are not described herein again.

S1401: The processor controls adjustment of the focal power of the one or more lenses that are in the inner focusing lens assembly and whose focal power is variable, to adjust the focal length of the lens assembly.

Optionally, the terminal controls, by using the processor, a current or voltage that is input to the lens whose focal power is variable, to adjust the focal power of the lens whose focal power is variable. Alternatively, the terminal controls, by using the processor, the lens whose focal power is variable to deform, to adjust the focal power of the lens whose focal power is variable. Certainly, the processor of the terminal may alternatively control, in another manner, the focal power of the lens whose focal power is variable to change, so as to adjust the focal length of the inner focusing lens assembly.

S1402: The processor controls the lens assembly driving apparatus, so that the lens assembly driving apparatus drives the inner focusing lens assembly to move along the optical axis, to perform focusing on a photographed object.

For descriptions of S1206 and S1207, refer to the foregoing descriptions. Details are not described herein again.

According to the macro imaging method provided in this embodiment of this application, when the terminal detects that a distance between the photographed object and the image sensor meets a macro condition, the terminal may change the focal power of the lens by controlling deformation or a refractive index of the lens, so as to adjust the focal length of the lens assembly, and may complete focusing by using the lens assembly driving apparatus. In this way, a high-quality image can be obtained through imaging in a macro mode.

Referring to FIG. 16(*a*) to FIG. 16(*c*), in some other embodiments of this application, after the camera of the terminal is turned on, as shown in FIG. 15(*a*), the user may trigger, by tapping a mode option 1503, the terminal to jump to a mode selection interface 1601 shown in FIG. 16(*b*). Then, on the mode selection interface 1601, the user may tap a macro photographing option 1602 to trigger the terminal to perform macro imaging. Optionally, after detecting that the user taps the macro photographing option 1602, the terminal having the structure shown in the foregoing case 1 may perform S1205 to S1207. After detecting that the user taps the macro photographing option 1602, the terminal having the structure shown in the foregoing case 2 may perform S1301, S1302, S1206, and S1207. After detecting that the user taps the macro photographing option 1602, the terminal having a structure such as the structure shown in the foregoing case 3 may perform S1401, S1402, S1206, and S1207.

Certainly, the terminal may alternatively jump to the mode selection interface 1601 in another manner. For example, when receiving a left-slide operation performed by the user on the camera interface 1502, the terminal jumps to the mode selection interface 1601. A manner of entering the mode selection interface is not limited in this embodiment of this application.

Optionally, in some scenarios, the user may not know an actual photographing effect of macro photographing. In this case, the terminal may indicate, to the user, the effect of macro photographing or other information about macro photographing. As shown in FIG. 16(*b*), the user chooses to enable macro photographing. In this case, the terminal may output an interface prompt, for example, a prompt box "macro photographing can support clear imaging when a photographed object is 1 cm to 5 cm away from an image sensor" pops up, and options "yes" and "no" may be set in the prompt box. When the user touches "yes", the terminal may determine that a real photographing intention of the user is macro photographing. Therefore, the terminal performs the foregoing macro photographing method.

In addition, in some other embodiments of this application, the user may further preset a macro photographing function of the terminal. For example, as shown in FIG. 17(a), on a setting interface 1701, the user may tap a macro photographing enabling option 1702 to enable the macro photographing function. Optionally, after the terminal enables the macro photographing function, the terminal may perform the foregoing macro imaging method. When the terminal does not enable the macro photographing function, the terminal does not have permission to perform the foregoing macro imaging method. When the user wants to implement macro photographing, if 1702 shown in FIG. 17(a) is off, the terminal may output a prompt interface to prompt the user to enable the macro photographing function, so that the terminal can obtain a clear image through imaging in a macro mode.

It should be noted that the terminal may enter the setting interface 1701 in a plurality of manners. For example, when receiving a right-slide operation performed by the user on the camera interface 1502, the terminal may jump to the setting interface 1701. A manner of entering the setting interface by the terminal is not limited in this embodiment of this application. Further, the terminal may save a setting performed by the user on the setting interface. Subsequently, when the user turns on the camera, if the terminal detects that the photographed object is relatively close to the image sensor, the terminal may perform the foregoing macro imaging method, to implement clear imaging in the macro mode.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A camera module, comprising:
 an image sensor;
 a lens module comprising at least five lenses disposed in sequence between an object side and an image side of the camera module, the at least five lenses including a first lens closest to the object side and a second lens next to the first lens,
   a ratio between a half-image height of the lens module and a total track length of the camera module being greater than or equal to 0.5 and less than or equal to 0.6,
   a field of view of the lens module being greater than or equal to 100 degrees,
   an aperture of the lens module being greater than or equal to F1.8 and less than or equal to F2.4, and
   an equivalent focal length of the lens module being greater than or equal to 10 mm and less than or equal to 20 mm; and
 a lens driving apparatus configured to move at least one of the at least five lenses in a direction of an optical axis of the lens module.

2. The camera module of claim 1, wherein the lens module is configured to support clear imaging when a distance between a photographed object and the image sensor is greater than or equal to 1 cm and less than or equal to 5 cm.

3. The camera module of claim 1, wherein the lens module includes six lenses, the six lenses including, in sequence from the object side to the image side, the first lens, the second lens, a third lens, a fourth lens, a fifth lens, and a sixth lens.

4. The camera module of claim 3, wherein the first lens has a negative focal power.

5. The camera module of claim 3, wherein the sixth lens has a negative focal power.

6. The camera module of claim 3, wherein the first lens has a negative focal power, the second lens has a positive focal power, the third lens has a negative focal power, the fourth lens has a positive focal power, the fifth lens has a positive focal power, and the sixth lens has a negative focal power.

7. The camera module of claim 1, wherein a horizontal magnification range of the lens module in a central field of view is greater than or equal to 0.03 and less than or equal to 0.43.

8. The camera module of claim 1, wherein the lens module has a negative distortion in an edge field of view, and the negative distortion is greater than or equal to −30%.

9. The camera module of claim 1, wherein the at least five lenses are made of materials selected from at least one of plastic, glass, or a mixture of plastic and glass.

10. A terminal device, comprising:
 a camera module including a lens module, a lens driving apparatus, and an image sensor;
 an input component configured to receive user inputs;
 an output component configured to output images or videos generated by the camera module; and
 a processor configured to determine a distance between a photographed object and the image sensor of the camera module, wherein:
 the lens module comprises at least five lenses disposed in sequence between an object side and an image side of the camera module, the at least five lenses including a first lens closest to the object side and a second lens next to the first lens,
   a ratio between a half-image height of the lens module and a total track length of the camera module is greater than or equal to 0.5 and less than or equal to 0.6,
   a field of view of the lens module is greater than or equal to 100 degrees,
   an aperture of the lens module is greater than or equal to F1.8 and less than or equal to F2.4,
   an equivalent focal length of the lens module is greater than or equal to 10 mm and less than or equal to 20 mm, and
 the lens driving apparatus is configured to move at least one of the at least five lenses of the lens module in a direction of an optical axis of the lens module.

11. The terminal device of claim 10, wherein the lens module includes six lenses, the six lenses including, in sequence from the object side to the image side, the first lens, the second lens, a third lens, a fourth lens, a fifth lens, and a sixth lens.

12. The terminal device of claim 10, wherein the first lens has a negative focal power.

13. The terminal device of claim 11, wherein the sixth lens has a negative focal power.

14. A method of macro imaging using a terminal device having a camera module, comprising:
receiving a first user input for activating the camera module, wherein the camera module includes an image sensor, a lens module comprising at least five lenses disposed in sequence between an object side and an image side of the camera module, and a lens driving apparatus configured to move at least one of the at least five lenses in a direction of an optical axis of the lens module,
the at least five lenses including a first lens closest to the object side and a second lens next to the first lens,
a ratio between a half-image height of the lens module and a total track length of the camera module being greater than or equal to 0.5 and less than or equal to 0.6,
a field of view of the lens module being greater than or equal to 100 degrees,
an aperture of the lens module being greater than or equal to F1.8 and less than or equal to F2.4, and
an equivalent focal length of the lens module being greater than or equal to 10 mm and less than or equal to 20 mm;
displaying a preview image received from the camera module;
starting a macro imaging mode of the terminal device;
focusing the camera module on a photographed object; and
generating an image of the photographed object in response to a second user input.

15. The method of claim 14, wherein starting the macro imaging mode of the terminal device includes:
determining a distance between the photographed object and the imaging sensor of the camera module is greater than or equal to 1 cm and less than or equal to 5 cm; and
starting, automatically, the macro imaging mode of the terminal device in response to the determination.

16. The method of claim 14, wherein starting the macro imaging mode of the terminal device includes:
determining a distance between the photographed object and the imaging sensor of the camera module is greater than or equal to 1 cm and less than or equal to 5 cm;
displaying, automatically, a first interface prompting a user whether to start the macro imaging mode; and
starting the macro imaging mode in response to a third user input indicating a selection for starting the macro imaging mode.

17. The method of claim 14, wherein starting the macro imaging mode of the terminal device includes:
displaying a first button;
receiving a third user input for activating the first button; and
starting the macro imaging mode in response to the activation of the first button.

18. The method of claim 14, wherein starting the macro imaging mode of the terminal device includes displaying a message indicating the macro imaging mode is started.

19. The method of claim 14, wherein focusing the camera module on the photographed object includes:
receiving a third user input for focusing the camera module; and
focusing the camera module in response to the third user input.

20. The camera module of claim 1, wherein the image sensor has a size greater than or equal to 1/3.06 inch and less than or equal to 1/2.78 inch.

* * * * *